United States Patent [19]

Suzuki et al.

[11] Patent Number: 5,621,810
[45] Date of Patent: Apr. 15, 1997

[54] IMAGE READING OR PROCESSING WITH ABILITY TO PREVENT COPYING OF CERTAIN ORIGINALS

[75] Inventors: Yoshiyuki Suzuki, Kawasaki; Masahiro Funada, Yokohama; Kenichi Outa, Yokohama; Michio Kawase, Yokohama, all of Japan

[73] Assignee: Canon Kabushiki Kaisha, Tokyo, Japan

[21] Appl. No.: 341,937

[22] Filed: Nov. 16, 1994

Related U.S. Application Data

[62] Division of Ser. No. 957,528, Oct. 6, 1992, Pat. No. 5,426,710, which is a division of Ser. No. 939,544, Aug. 28, 1992, Pat. No. 5,216,724, which is a continuation of Ser. No. 478,280, Feb. 9, 1990, abandoned.

[30] Foreign Application Priority Data

Feb. 10, 1989 [JP] Japan ................................. 1-031415
Feb. 10, 1989 [JP] Japan ................................. 1-031419
Apr. 25, 1989 [JP] Japan ................................. 1-106711
Apr. 27, 1989 [JP] Japan ................................. 1-111025

[51] Int. Cl.⁶ ........................................................ G06K 9/00
[52] U.S. Cl. .......................... 382/135; 382/191; 382/227; 380/3; 399/39
[58] Field of Search ........................... 358/526, 538, 358/453, 462, 464; 382/7, 135, 17, 191, 16, 198, 38, 227; 355/201; 380/3, 51, 54

[56] References Cited

U.S. PATENT DOCUMENTS

| | | | |
|---|---|---|---|
| 3,942,154 | 3/1976 | Akami et al. | 382/17 |
| 4,191,940 | 3/1980 | Polcyn et al. | 382/17 |
| 4,281,921 | 8/1981 | Van Auken | 355/77 |
| 4,325,981 | 4/1982 | Sugiura et al. | 427/7 |
| 4,490,846 | 12/1984 | Ishida et al. | 382/7 |
| 4,547,896 | 10/1985 | Ohtombe et al. | 382/17 |
| 4,550,433 | 10/1985 | Takahashi | 382/7 |
| 4,586,811 | 5/1986 | Kubo et al. | 355/14 R |
| 4,618,257 | 10/1986 | Bayne et al. | 356/71 |
| 4,628,194 | 12/1986 | Dobbins et al. | 235/377 |
| 4,652,914 | 3/1987 | Kitagawa | 358/75 |
| 4,723,147 | 2/1988 | Harada | 355/14 R |
| 4,723,149 | 2/1988 | Harada | 355/14 R |
| 4,728,984 | 3/1988 | Daniele | 355/6 |
| 4,739,377 | 4/1988 | Allen | 355/133 |
| 4,749,087 | 6/1988 | Buttifant | 209/534 |
| 4,772,958 | 9/1988 | Suzuki | 358/294 |
| 4,797,945 | 1/1989 | Suzuki et al. | 382/56 |
| 4,812,904 | 3/1989 | Maring et al. | 382/17 |
| 4,881,268 | 11/1989 | Uchida et al. | 382/7 |
| 4,973,851 | 11/1990 | Lee | 250/556 |
| 5,010,580 | 4/1991 | Vincent et al. | 382/17 |

FOREIGN PATENT DOCUMENTS

| | | | |
|---|---|---|---|
| 342060 | 11/1989 | European Pat. Off. | G03G 15/00 |
| 0342060 | 11/1989 | European Pat. Off. | G03G 15/01 |
| 0529745 | 3/1993 | European Pat. Off. | G03G 15/00 |
| 55-123270 | 9/1980 | Japan | G03G 15/10 |
| 60-229572 | 4/1984 | Japan | G03G 15/00 |
| 1-285977 | 11/1989 | Japan | G03G 15/00 |
| 2155860 | 10/1985 | United Kingdom | G03G 15/00 |
| WO85/01129 | 3/1985 | WIPO | G03G 15/00 |
| 85/01129 | 3/1985 | WIPO | G07C 3/00 |

Primary Examiner—Leo Boudreau
Assistant Examiner—Bipin Shalwala
Attorney, Agent, or Firm—Fitzpatrick, Cella, Harper & Scinto

[57] ABSTRACT

There is disclosed an apparatus for image reading or processing, that can precisely identify a particularly pattern, such as of banknotes or securities faithful copying of which is to be prohibited. The apparatus is provided with a detecting unit for detecting positional information of an original image, and a discriminating unit for extracting the pattern data of a certain part of the original image and discriminating whether the original image is the predetermined image, based on the similarity between the pattern data and the predetermined pattern.

20 Claims, 37 Drawing Sheets

FIG. 3

| | IMAGE SCANNER | PRINTER |
|---|---|---|
| FIRST SCAN | MODE 1 DETECTING ROUGH POSITION OF WATERMARK | MAGENTA OUTPUT |
| SECOND SCAN | MODE 2 DETECTING ACCURATE POSITION AND ANGLE OF WATERMARK | CYAN OUTPUT |
| THIRD SCAN | MODE 3 EXTRACTING RED SEAL | YELLOW OUTPUT |
| FOURTH SCAN | MODE 4 PROCESSING FORGERY PREVENSION | BLACK OUTPUT |

FIG. 11
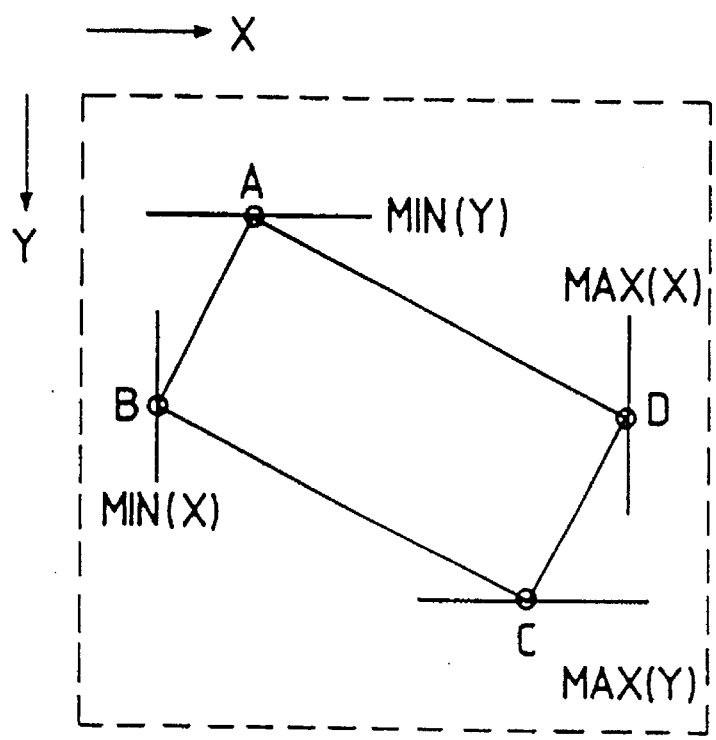
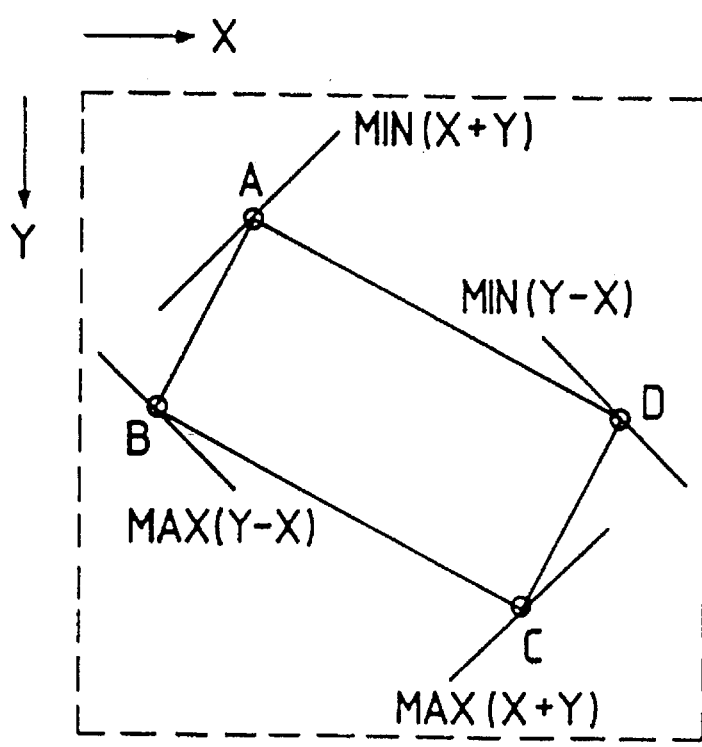

FIG. 13
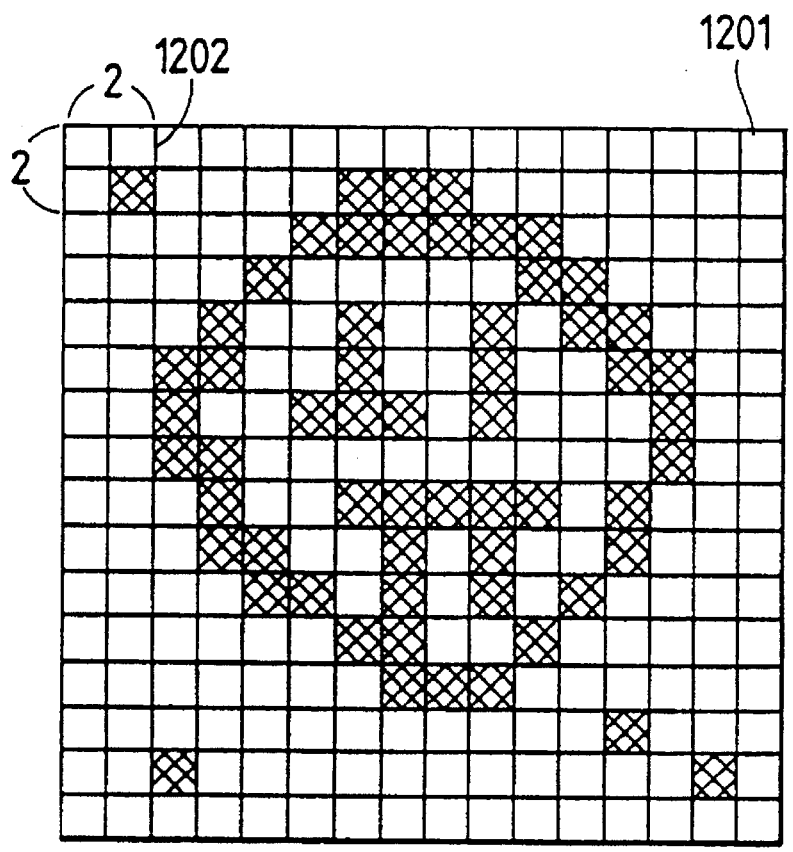
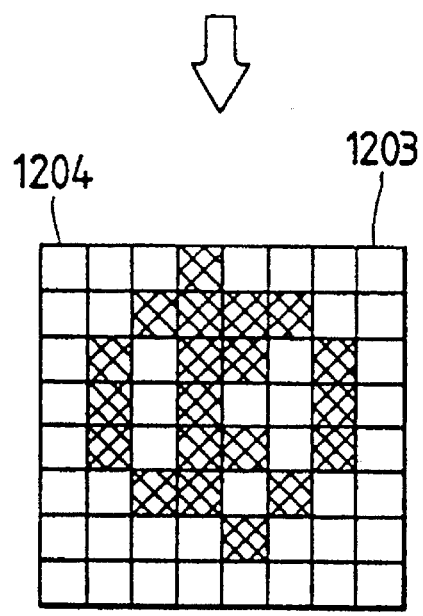

1301 ORIGINAL PLATE
1302 BILL
1303 SPECIFIC PORTION
θ

EXTRACTED SPECIFIC PORTION

UNROTATED REFERENCE PATTERN

EXTRACTED PATTERN
B(i,j)

REFERENCE PATTERN
P(i,j)

FIG. 24

|  | WRITE ADDRESS | WRITE DATA RGB | READ ADDRESS OUTPUT FOR AND GATE 403 | |
|---|---|---|---|---|
|  |  |  | IF "0" | IF "1" |
| 1ST LINE (1024 PIXELS) | 00000H<br>00001H<br>⟨<br>003FFH | 000H<br>000H<br>⟨<br>FFFH | 00000H<br>00001H<br>⟨<br>003FFH | 003FFH<br>003FEH<br>⟨<br>00000H |
| 2ND LINE | 00400H<br>00401H<br>⟨<br>007FFH | 000H<br>000H<br>⟨<br>FFFH | 00400H<br>00401H<br>⟨<br>007FFH | 007FFH<br>007FEH<br>⟨<br>00400H |
|  | 00800H<br>⟨ | 000H<br>⟨ | 00800H<br>⟨ | 00800H<br>⟨ |
| 1024TH LINE | FFC00H<br>FFC01H<br>⟨<br>FFFFFH | 000H<br>000H<br>⟨<br>FFFH | FFC00H<br>FFC01H<br>⟨<br>FFFFFH | FFFFFH<br>FFFFEH<br>⟨<br>FFC00H |

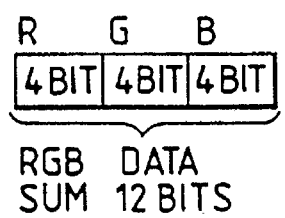

RGB DATA
SUM 12 BITS

| TC⟨1⟩ | TC⟨0⟩ | OUTPUT FROM SELECTOR 110 |
|---|---|---|
| 0 | 0 | Y SIGNAL |
| 0 | 1 | M SIGNAL |
| 1 | 0 | C SIGNAL |
| 1 | 1 | BK SIGNAL |

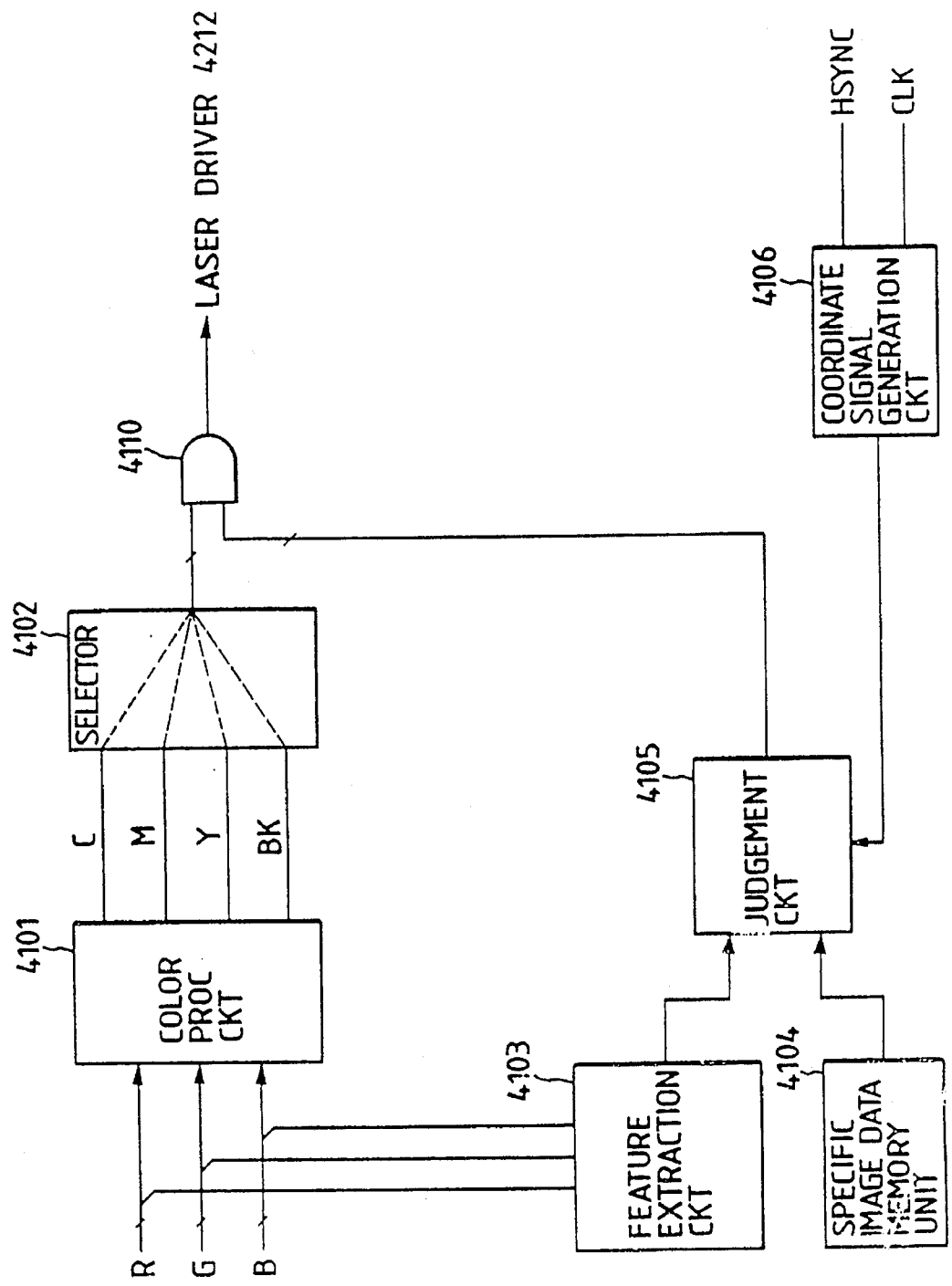

IMAGE READING OR PROCESSING WITH ABILITY TO PREVENT COPYING OF CERTAIN ORIGINALS

This application is a division of application Ser. No. 07/957,528 filed Oct. 6, 1992, now allowed, U.S. Pat. No. 5,426,710 which is a division of application Ser. No. 07/939,544 filed Aug. 28, 1992, issued Jun. 1, 1993 as U.S. Pat. No. 5,216,724, which is a continuation of application Ser. No. 07/478,280 filed Feb. 9, 1990, now abandoned.

BACKGROUND OF THE INVENTION

1. Field of the Invention

The present invention relates to an apparatus for image reading or processing which is able to discriminate whether an input image is a predetermined image.

2. Related Background Art

The technical development for hard copying, for example with copying machines, has been aimed at faithful reproduction of the original image, and as a result, there is now made available a high-quality copying machine which can provide a reproduced image excellent in color reproduction and not distinguishable from the original image. Particularly, the development of digital full-color copying machine has improved the quality of copied images to a level not distinguishable from the original image by human eyes, and has enabled one to obtain such copy within a short time with a simple operation.

However, 00 such image reproduction in a form very close to the original image could give rise to significant problems, as it may be abused for forgery of banknotes or other valuable securities. Existing image processing apparatus, such as copying machines, are powerless to detect and prevent such abuse.

The assignee of the present application already has disclosed technologies for preventing forgery of particular images in the U.S. Pat. Ser. No. 351,165, filed May 12, 1989 and in the new U.S. Patent Application based on the priority Japanese Patent Application No. 63-267198, filed Oct. 25, 1988.

The former discloses a technology for altering the image forming process in a case where the original image to be copied is identified as a predetermined particular image, and for altering the process according to the level of similarity to the particular image.

Also, the latter application discloses a technology for registering an image of which copying is to be prohibited by reading said image with a reader, and for renewing such registration.

However, such technologies still have room for improvement in the realization of the image processing apparatus capable of effectively preventing the forgery of particular images, particularly in the detection of particular image and in the image processing control in response to such detection.

SUMMARY OF THE INVENTION

In consideration of the foregoing, an object of the present invention is to provide an apparatus for image processing or reading, capable of precisely identifying predetermined original images, such as banknotes or valuable securities, of which faithful reproduction is to be prohibited.

The above-mentioned object can be attained, according to a preferred embodiment of the present invention, by an image processing or reading apparatus provided with detection means for detecting the positional state of an original image, and discrimination means for extracting image data of a particular part of said original image in response to the detection by said detection means and discriminating the similarity thereof to a pre-registered pattern, wherein a predetermined original image is identified on the basis of said similarity. Such structure allows precise discrimination of a particular image such as of banknote placed in an arbitrary position, for example, on an original support plate, and allows one to alter the image forming process for such particular image alone.

A second object of the present invention is to provide predetermined image detecting means, adapted for use in an apparatus completing an image reading operation by plural mechanical scanning operations, for example an electrophotographic color copying machine.

The above-mentioned object can be attained, according to another preferred embodiment of the present invention, by an image reading apparatus provided with scanning means for scanning an image plural times, and discrimination means for discriminating whether image is a predetermined image stepwise in said scanning operations, utilizing the outputs of plural scanning operations of said scanning means.

Still another object of the present invention is to provide an image processing apparatus capable of securely prohibiting the reproduction of a predetermined image when it is entered.

The above-mentioned object can be attained, according to still another preferred embodiment of the present invention, by an image processing apparatus provided with means for discriminating whether the input image is a predetermined image, and control means for deactivating a part of the image forming apparatus in case said discrimination means identifies that said input image is said predetermined image.

Also according to another embodiment, there is disclosed an image processing apparatus provided with means for discriminating whether the input image is a predetermined image, and control means for changing the process for a part of color components constituting said input image, in a case where said input image is identified as said predetermined image by said discrimination means.

Still other objects features and advantages of the present invention will become fully apparatus from the following description of the preferred embodiments, which is to be taken in conjunction with the attached drawings.

BRIEF DESCRIPTION OF THE DRAWINGS

FIG. 3 is a chart showing the relation between different modes and four scanning operations;

FIG. 11 is a view showing the principle of positional detection;

FIGS. 12, 13, 14A, 14B, 14C, 15A and 15B are views showing the principle of pattern matching;

FIG. 24 is a chart showing an example of output of the address decoder 4115;

FIG. 36 is a block diagram of a seventh embodiment.

DETAILED DESCRIPTION OF THE PREFERRED EMBODIMENTS

Now the present invention will be clarified in greater detail by preferred embodiments thereof shown in the attached drawings.

In the following embodiments there are shown applications of the present invention to a copying machine, but the present invention is not limited to such embodiments and is naturally applicable to various other apparatus.

[1st embodiment]

The present embodiment is a digital color copying machine for effecting color recording in plane-sequential manner, and the detection of predetermined image is conducted stepwise in sequential manner by plural scanning operations in relation to the plane-sequential recording.

Figure 2:
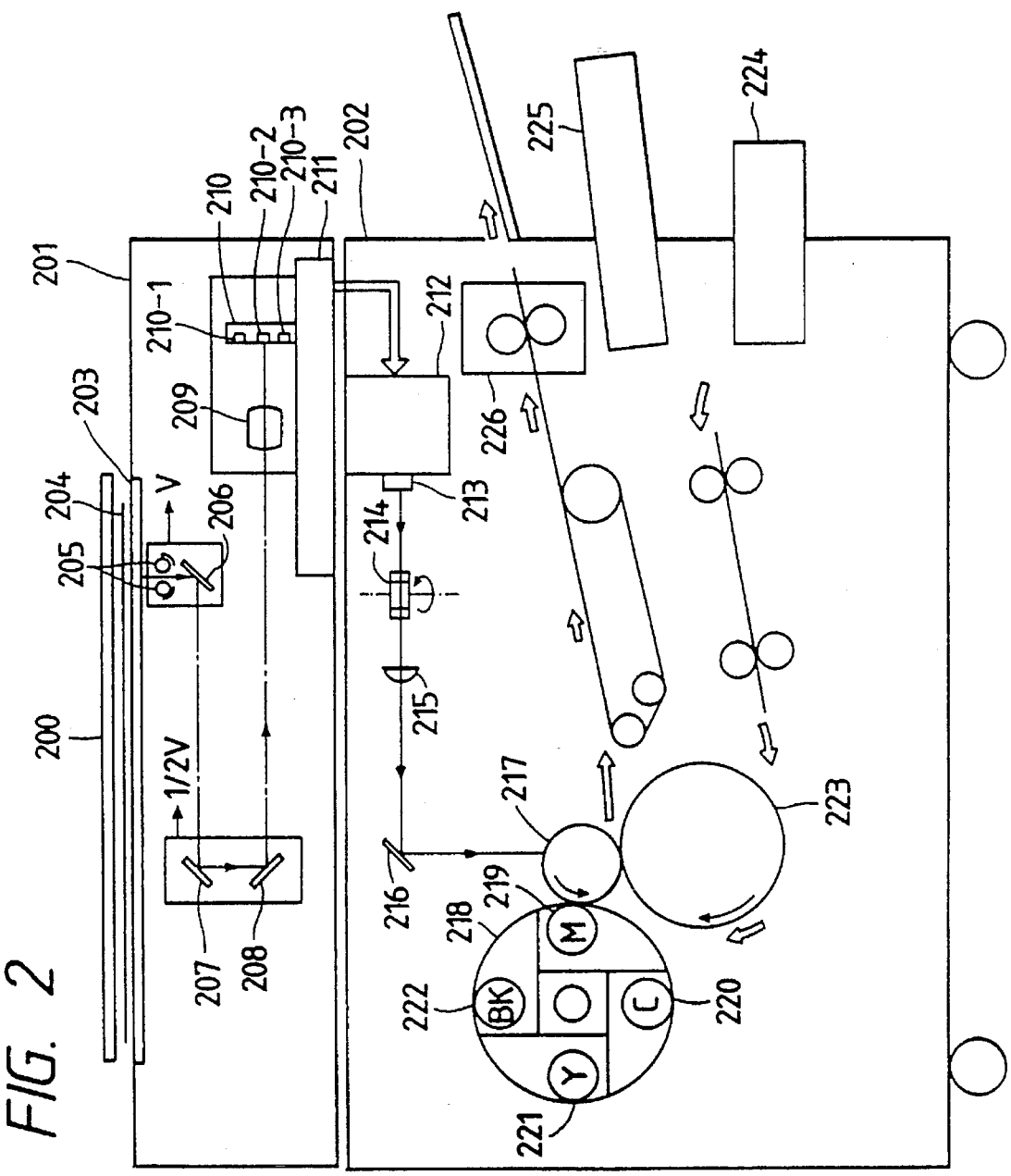
FIG. 2 is a schematic view of an apparatus constituting a first embodiment of the present invention.

FIG. 2 is an external view of an apparatus constituting the first embodiment of the present invention.

The apparatus shown in FIG. 2 is composed of an image scanner unit 201 for reading an original image and applying digital signal processing thereto, and a printer unit 202 for printing a full-color image corresponding to the original image read by the image scanner unit 201.

An original document 204, supported between a mirror-faced pressing plate 200 and an original supporting glass plate (hereinafter called platen) 203 is illuminated by a lamp 205, and the reflected light is guided by mirrors 206, 207, 208 and is focused by a lens 209 onto a 3-line sensor (hereinafter called CCD) 210, which sends the full-color information in the form of red (R), green (G) and blue (B) components to a signal processing unit 211. The entire area of the original is scanned by mechanical movement of the lamp 205 and the mirror 206 with a speed v, and the mirrors 207, 208 with a speed v/2, in a direction perpendicular to the electrical scanning direction of the line sensor. The signal processing unit 211 electrically processes the signals obtained by said scanning operation to obtain components of magenta (M), cyan (C), yellow (Y) and black (Bk) which are sent to the printer unit 202. One of the components M, C, Y, and Bk is supplied to the printer unit 202 at each original scanning operation in the image scanning unit 201, so that a printout is completed by four original scanning operations.

The image signal of the component M, C, Y or Bk sent from the image scanner unit 201 is supplied to a laser driver 212, which in response modulates a semiconductor laser 213. The emitted laser beam scans a photosensitive drum 217, by means of a polygon mirror 214, an θ lens 215, and a mirror 216.

A rotary developing unit 218 is composed of a magenta developing station 219, a cyan developing station 220, a yellow developing station 221 and a black developing station 222, which are in succession brought into contact with the photosensitive drum 217, thereby developing electrostatic latent images formed thereon with toner.

A sheet fed from a sheet cassette 224 or 225 is wound on a transfer drum 223, and receives the transfer of the image developed on the photosensitive drum 217.

After four color images of M, C, Y and Bk are transferred in succession, the sheet is discharged through a fixing unit 226.

The present embodiment will be explained in detail with respect to the prevention of forgery of a Japanese 10,000-Yen banknote (or bill), as an example of the predetermined image, but the present invention is naturally not limited to such embodiment, and is applicable to the prevention of forgery of other predetermined images such as other banknotes, valuable securities, contract documents and so on.

In the present embodiment, a copying operation is completed by four scanning operations as explained above, and the function of the image scanner unit 201 and the printer unit 202 in each scanning operation are shown in FIG. 3.

In case of prevention of a forgery of 10,000-Yen banknote, in the first scanning operation, the image scanner is in a mode 1 for detecting the approximate position of the 10,000-Yen banknote, and the printer unit forms the magenta image.

In the second scanning operation, the image scanner is in a mode 2 for detecting the exact position and angle of the banknote.

In the third scanning operation, the image scanner is in a mode 3, for calculating the position of the red stamp mark of 10,000-Yen banknote from the position and angle detected in the second scanning operation, and after scanning extracts the data of said red stamp mark and discriminates whether it is actually the red stamp mark. At the same time the printer unit forms a yellow image.

In the fourth scanning operation, the image scanner is in a mode 4, and effects the measure for prevention of forgery, if the forgery is identified to be intended in the third scanning operation.

Figure 5:
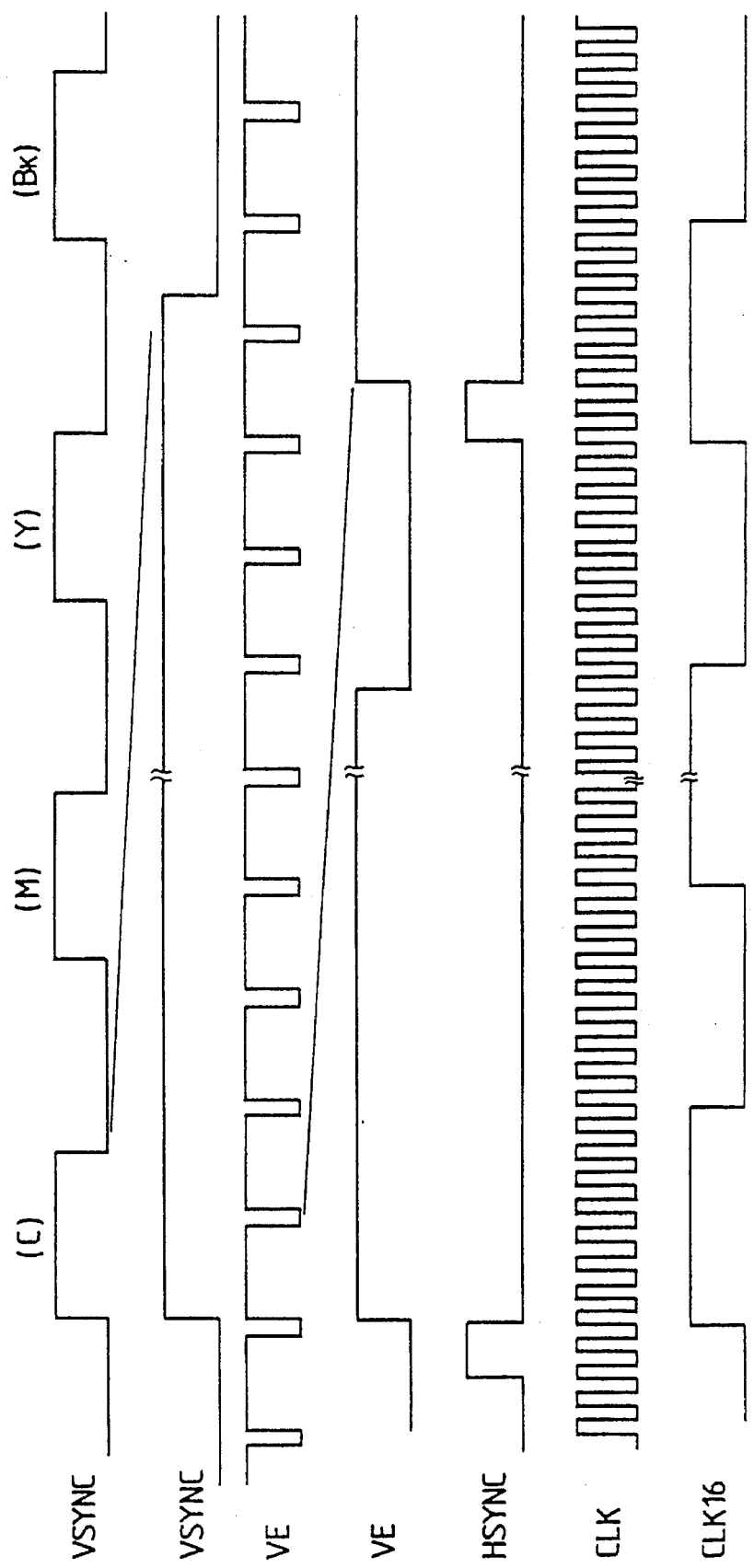
FIG. 5 is a timing chart thereof.

FIG. 5 is a timing chart showing the function of various parts of the image scanner of the present embodiment.

A VSYNC signal, indicating the effective image section in the sub scanning direction, assumes a level "1" in the sections for effecting the image scanning operations for C, M, Y and Bk in succession. An effective image section signal VE in the main scanning direction assumes a level "1" where the image is rendered effective. A main scanning synchronization signal HSYNC regulates, in the section of level "1", the start position of the main scanning operation. A pixel synchronization (clock) signal CLK causes the transfer of the image data at the upshift from "0" to "1". A signal CLK16 regulates the timing of a 16×16 block processed signal to be explained later, at the upshift from "0" to "1".

[Image scanner unit]

Figure 4:
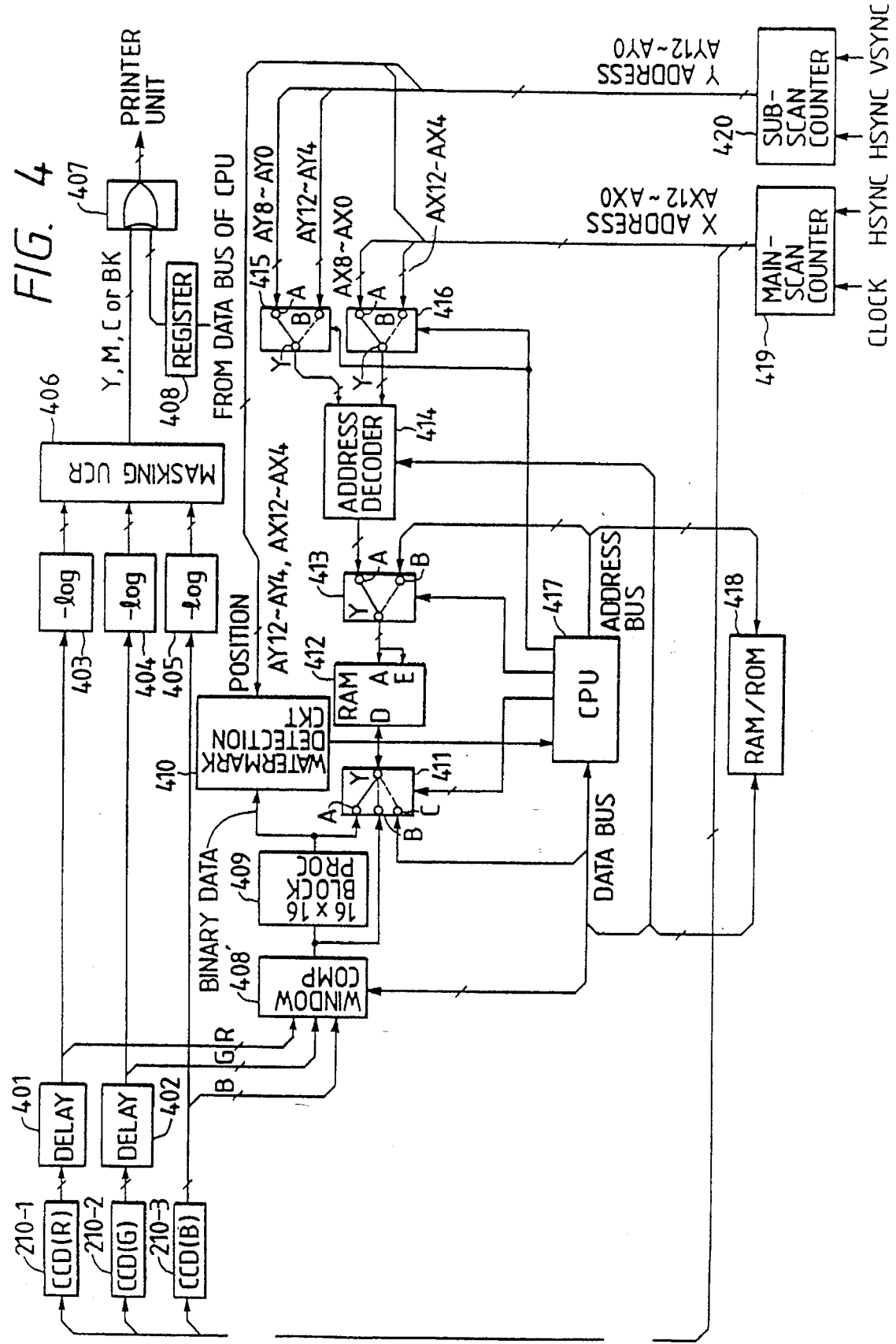
FIG. 4 is a block diagram of an image scanner.

FIG. 4 is a block diagram of the image scanner unit 201, in which CCD's 210-1, 210-2, 210-3 having spectral sensitivities respectively in red, green and blue colors generate signals digitized in 8 bits or levels from 0 to 255.

Figure 1:
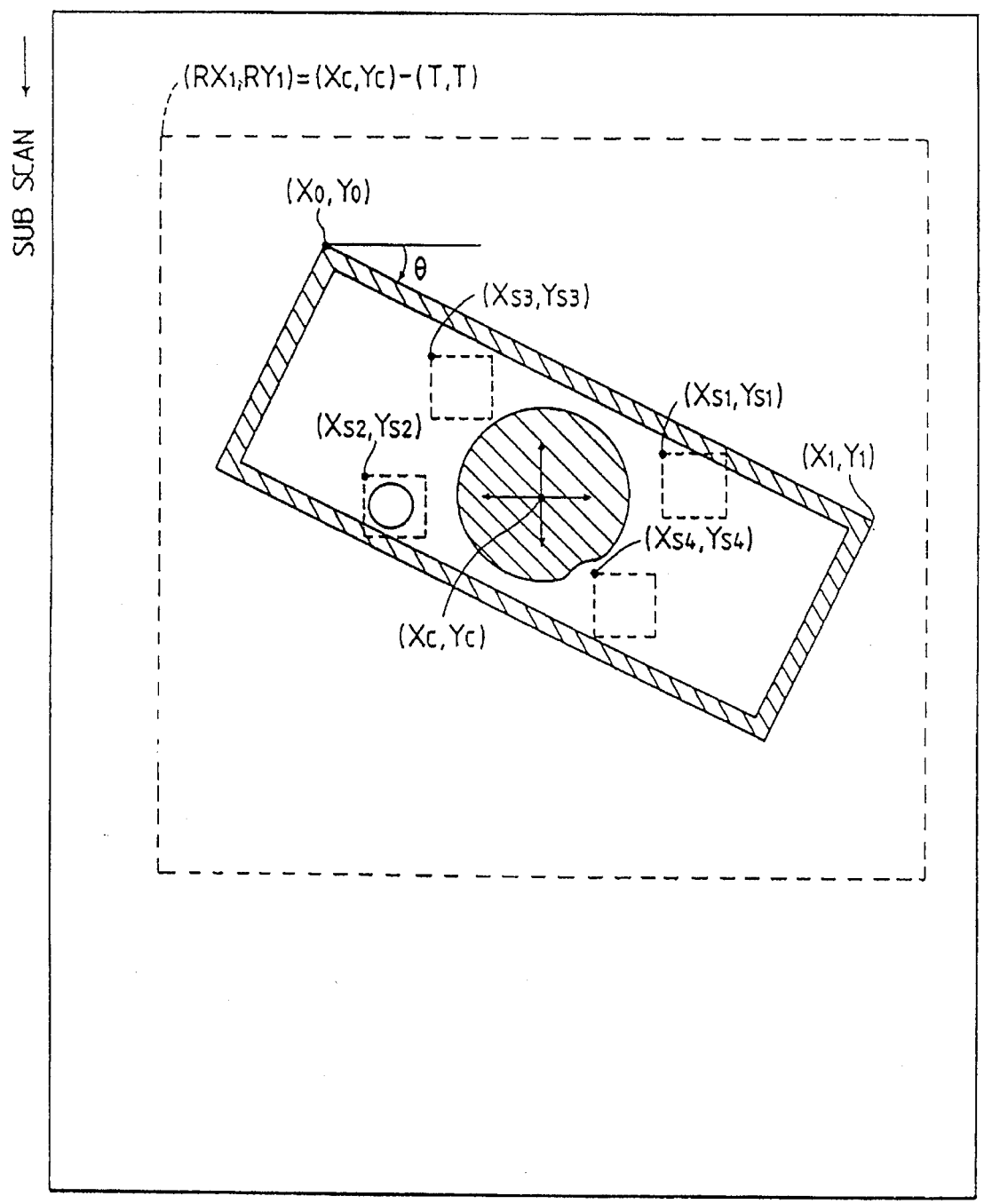
FIG. 1 is a view showing a banknote placed on an original support table.

Since said sensors 210-1, 210-2, 210-3 are mutually spaced as shown in FIG. 1, delay elements 401, 402 are provided for compensating the spatial aberration.

Logarithmic converters 403, 404, 405 are composed of look-up table ROM's and convert luminance signals into density signals. A known masking and undercolor removal (UCR) circuit 406 generates, from input signals of three primary colors, output signals of Y, M, C, and Bk with a predetermined number of bits (for example, 8 bits), at each scanning operation.

An OR gate 407 calculates the logical OR (logical sum) of the output of the circuit 406 and the value stored in a register 408. The register 408 normally has a value $00_H$ so that the output of the circuit 406 is transmitted to the printer unit, but, in case of a forgery preventing operation, a value $FF_H$ is set in the register 408 through a data bus from a CPU 417, thereby providing an image uniformly filled with toner.

The CPU 417 controls the apparatus in various modes thereof. A window comparator 408 discriminates the input of a signal of a predetermined level designated by the CPU 417, thus detecting the background level in the modes 1 and 2, or the red stamp mark in the mode 3. A block process circuit 409 effects processing on every 16×16 block of the output signals of the window comparator 408.

A random access memory (RAM) 412 stores data switched by a selector 411, at addresses selected by a selector 413.

A main scanning counter 419 is reset by the HSYNC signal, then effects a count-up operation in synchronization with the CLK signal, and generates 13-bit main scanning (X) addresses X12 - X0.

A sub scanning address counter 420 is reset in the section "0" of the VSYNC signal, effects a count-up operation at the timing of the HSYNC signal, and generates 13-bit sub-scanning (Y) addresses Y12 - Y0.

The CPU 417 effects writing data into and reading data from the RAM 412 by controlling selectors 411, 413, 415, and 416 and an address decoder 414, according to the operating mode. The CPU 417 is provided with a RAM/ROM 418. A watermark detection circuit 410 serves to detect the watermarked portion of the banknote.

Figure 6:
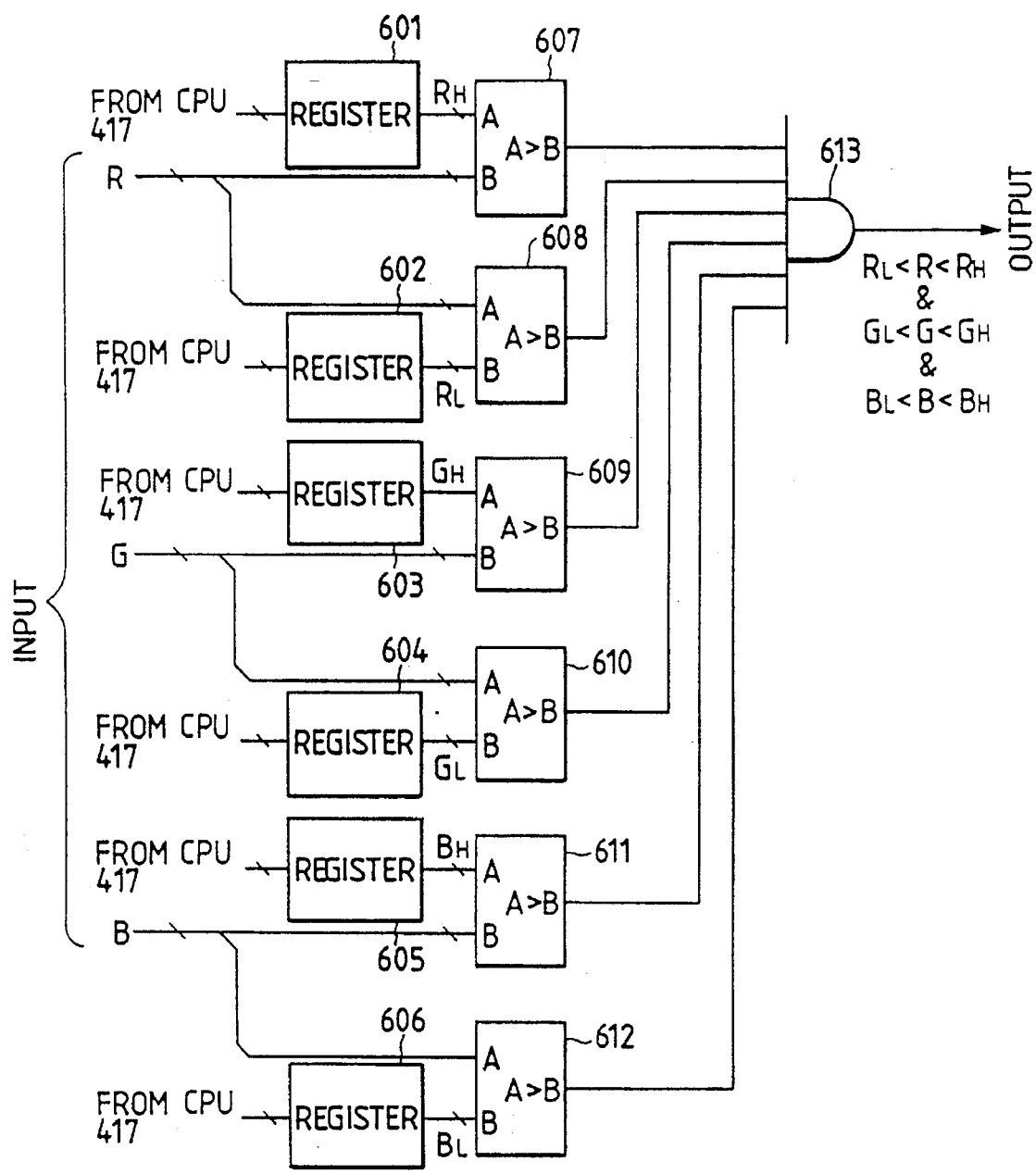
FIG. 6 is a block diagram of a window comparator shown in FIG. 4.

FIG. 6 is a block diagram of the window comparator 408 shown in FIG. 4, wherein registers 601, 602, 603, 604, 605, 606 and are connected to the data bus of the CPU 417 and store values designated by the CPU 417.

Each of comparators 607, 608, 609, 610, 611, and 612 releases an output signal "1" only when input signals A and B satisfy a condition A>B.

An AND gate 613 releases an output signal "1" only when all the comparators provide output signals "1", and otherwise releases a signal "0". Thus, when the registers 601, 602, 603, 604, 605, and 606 respectively store $R_H$, $R_L$, $G_H$, $G_L$, $B_H$, and $B_L$, the window comparator 408 releases an output signal "1" only when the input signals R, G, and B satisfy all the relations:

$R_L < R < R_H$ $G_L < G < G_H$ and $B_L < B < B_H$ and an output signal "0" otherwise.

Figure 7:
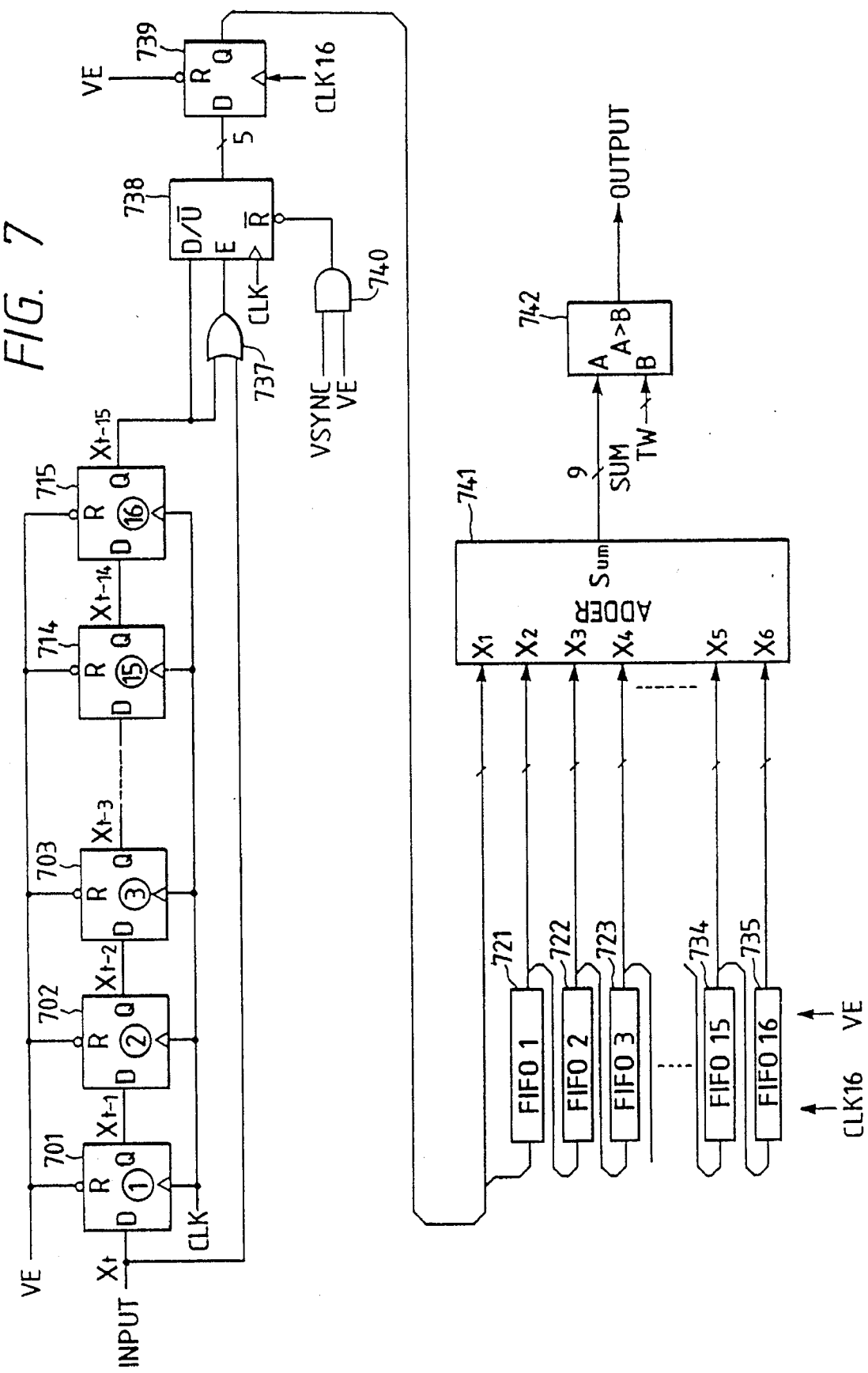
FIG. 7 is a circuit diagram of a block processing unit shown in FIG. 4.

FIG. 7 is a circuit diagram of the block process circuit 409 shown in FIG. 4.

Fifteen serially connected fifteen D-flip-flops (DFF) 701–715 serve to delay the input signal in succession, in synchronization with the pixel clock signal CLK, and are cleared to "0" in the non-image section where VE="0".

There are also provided a 5-bit up-down counter 738, an OR gate 737 and an AND gate 740, which function as shown in the following table.

| VSYNC | VE | $X_t$ | $X_{t-15}$ | Counter output |
|---|---|---|---|---|
| 0 | X | X | X | 0 (cleared) |
| X | 0 | X | X | 0 (cleared) |
| 1 | 1 | 0 | 0 | Retain |
| 1 | 1 | 0 | 1 | Count-down |
| 1 | 1 | 1 | 0 | Count-up |
| 1 | 1 | 1 | 1 | Retain |

Thus the output of the counter 738 is cleared to "0" in a period where the signal VSYNC or VE is "0"; retained when $X_t = X_{t-15}$; counted up when $X_t =$ of 2's and $X_{t-15}=0$; or counted down when $X_t=0$ and $X_{t-15}=1$.

In this manner there is obtained the total number "1" in sixteen data $X_t$–$X_{t-15}$.

The output is further supplied to first-in-first-out (FIFO) memories 721–735 of one line each, whereby the data of 16 lines are simultaneously supplied to and added in an adder 741. Thus the total number SUM of 1's in a window of 16×16 pixels is obtained, ranging from 0 to 256.

A digital comparator 742 compares the output SUM of the adder 741 with a reference value TW predetermined by the CPU 714 and releases the result "1" or "0".

In this manner the noise elimination in a block of 16×16 pixels can be achieved by suitably selecting the reference value TW.

Figure 8:
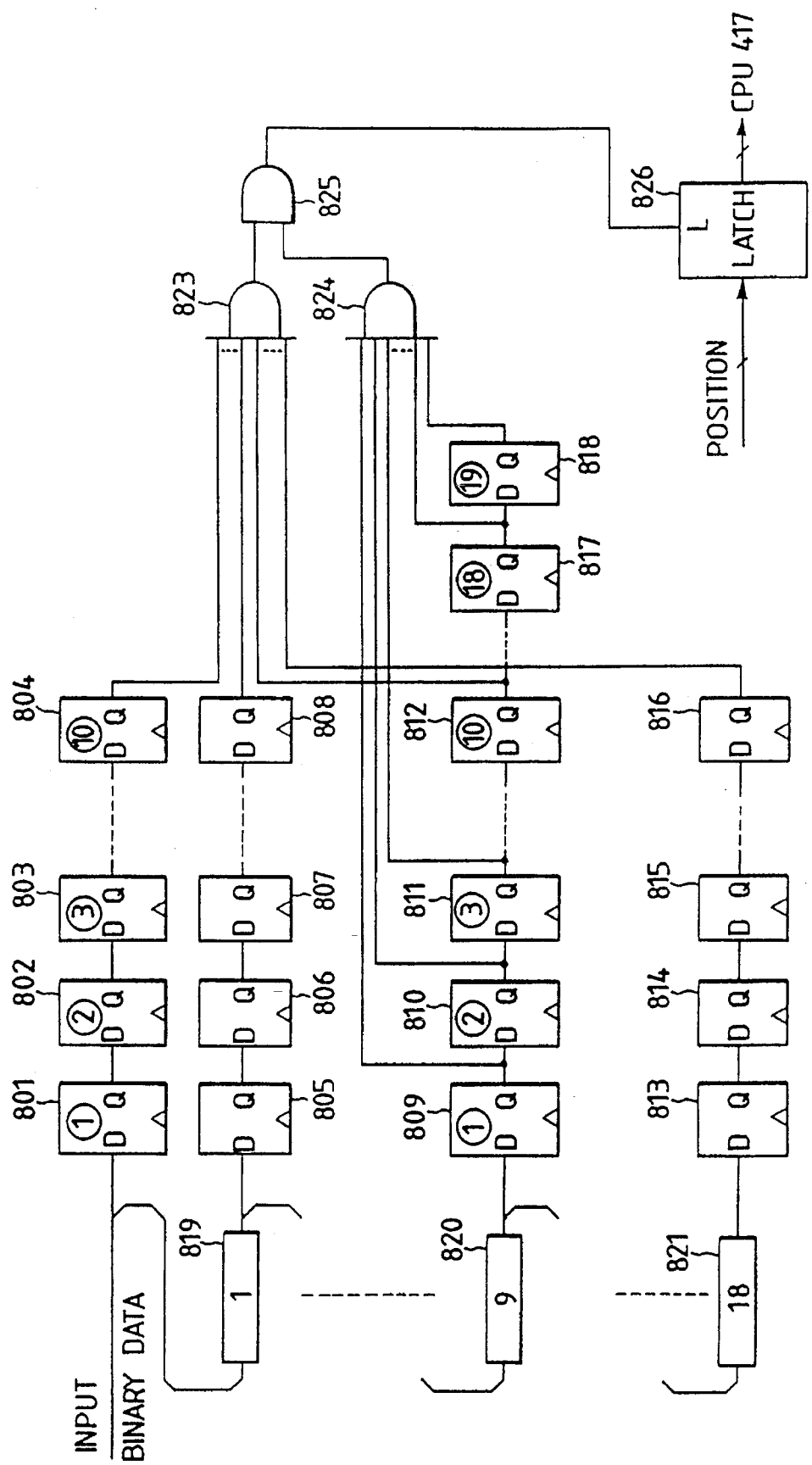
FIG. 8 is a circuit diagram of a water-mark detection unit shown in FIG. 4.

FIG. 8 shows watermark detection circuit 410, which simultaneously processes 19 lines with 18 FIFO memories 819, ..., 820, ..., 821.

Ten D-flip-flops are serially connected to each of the 19 lines, as indicated by 801, 802, 803, ..., 804; 805, 806, 807, ..., 808; ...; 809, 810, 811, ..., 812; ...; 813, 814, 815, ..., 816, and additional nine D-flip-flops, indicated by ..., 817, 818 are serially connected to the D-flip-flop 812. All these DFF's are driven by the clock signal CLK16. A signal "1" is released through AND gates 823, 824, 825 when the DFF's 804, 808 ..., 812, 816 (19 vertical blocks) and DFF's 809, 810, 811, 812, ..., 817, and 818 (19 horizontal blocks) provide output signals "1", and the position in this state is latched and sent to the CPU 417.

Figure 9:
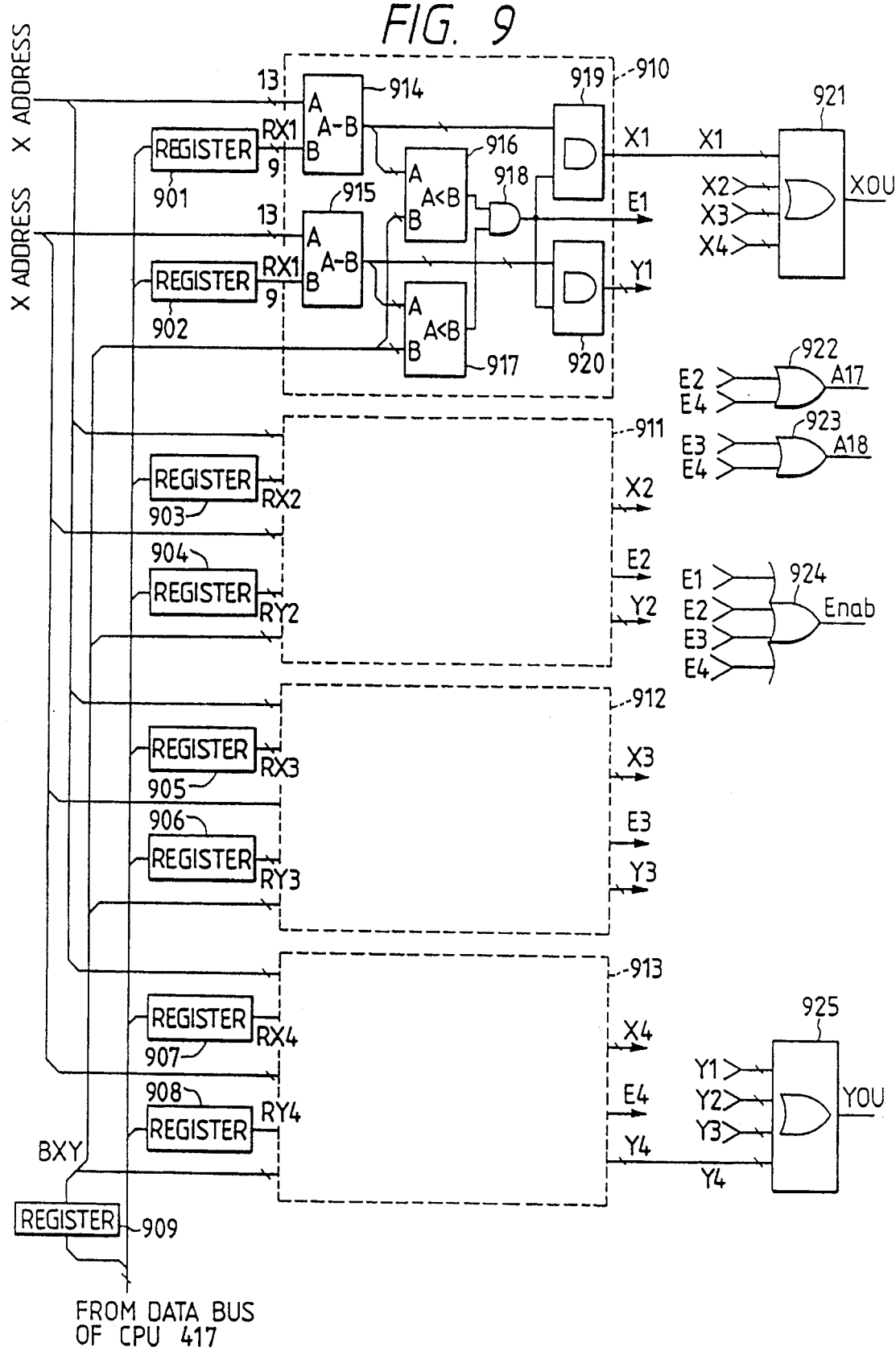
FIG. 9 is a circuit diagram of an address decoder shown in FIG. 4.

FIG. 9 is a block diagram of the address decoder 414.

Registers 901–909 connected to the data bus of the CPU are respectively given desired values by the CPU.

There are provided four circuit blocks 910–913, but the following explanation will be given on the block 910, since they are mutually identical in structure.

Each of subtractors 914 and 915 provides A–B based on inputs A and B. The most significant bis ("MSB") of said output serves as a sign bit, which is "1" if A–B is negative.

Each of comparators 916 and 917 provides an output "1" if inputs A and B satisfy a relation A>B, but provides "0" if the MSB of the input A is "1", regardless of the input B.

Thus, when the register 909 stores a value BXY, AND gates 918, 919, and 920 of the block 910 provide outputs:

X1=X-address−RX1,
Y1=Y-address−RY1,
E1=1, only if the following conditions:

$$\left.\begin{array}{l} RX1 < \text{X-address} < RX1 + BXY \\ RY1 < \text{Y-address} < RY1 + BXY \end{array}\right\} \quad (1)$$

are satisfied.

Similarly, in the block 911, there are obtained outputs:

X2=X-address−RX2,
Y2=Y-address−RY2,
E2=1, only if the following conditions are satisfied:

$$\left.\begin{array}{l} RX2 < \text{X-address} < RX2 + RXY \\ RY2 < \text{Y-address} < RY2 + RXY \end{array}\right\} \quad (2)$$

Similarly, in the block 912, there are obtained outputs:

X3=X-address−RX3,
Y3=Y-address−RY3,
E3=1, only if the following conditions:

$$\left.\begin{array}{l} RX3 < \text{X-address} < RX3 + RXY \\ RY3 < \text{Y-address} < RY3 + RXY \end{array}\right\} \quad (3)$$

are satisfied.

Similarly, in the block 913, there are obtained outputs:

X4=X-address−RX4,
Y4=Y-address−RY4,
E4=1, only if the following conditions:

$$\left.\begin{array}{l} RX4 < \text{X-address} < RX4 + RXY \\ RY4 < \text{Y-address} < RY4 + RXY \end{array}\right\} \quad (4)$$

are satisfied.

When the values RX1, RY1, ... , RX4, and RY4 are so selected that only one (at the maximum) of the conditions (1), (2), (3) and (4) can be satisfied at one time, OR gates 921, 922, 923, 924, and 925 provide output signals in the following manner.

The OR gate 921 releases one of X1, X2, X3 and X4.

The OR gate 924 releases a signal "1" when any of the conditions is satisfied.

The OR gate 925 releases one of Y1, Y2, Y3 and Y4.

The OR gates 922, 923 provides outputs signals in the following manner:

| Condition     | 922 (A17) | 923 (A18) |
| ------------- | --------- | --------- |
| (1) satisfied | 0         | 0         |
| (2) satisfied | 1         | 0         |
| (3) satisfied | 0         | 1         |
| (4) satisfied | 1         | 1         |
| none satisfied| 0         | 0         |

[Process flow]

FIG. 3 shows four modes 1–4 of the image scanner unit and the outputs of the printer unit corresponding to four scanning operations in the present embodiment.

Figure 10:
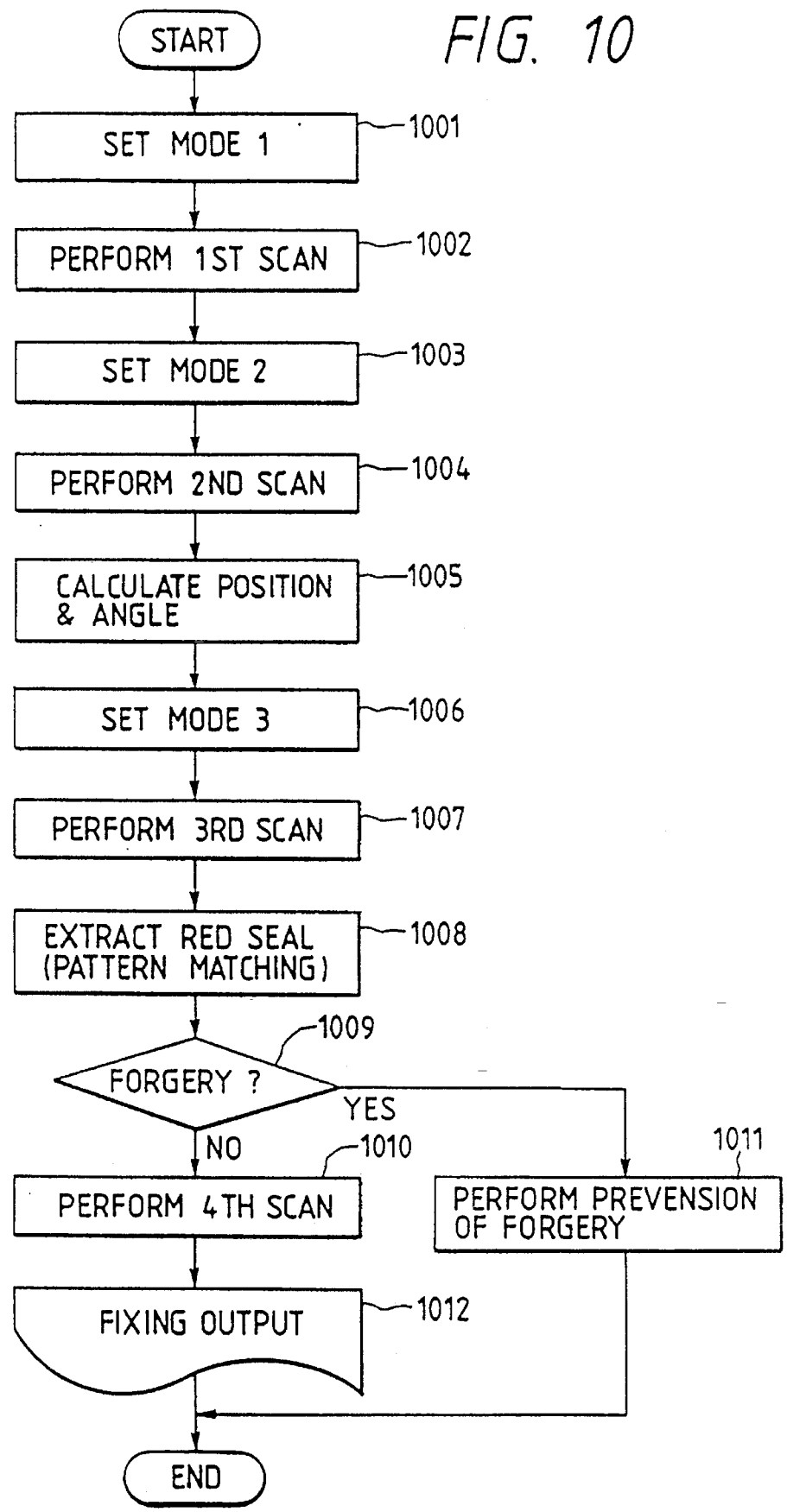
FIG. 10 is a flow chart of the function of the apparatus.

FIG. 10 is a flow chart showing the control sequence of the CPU.

In a step 1001, the CPU 417 sets the mode 1 for the first scanning operation. In mode 1, the printer unit generates the magenta image, and the approximate position of the watermarked portion of the banknote is detected. For this purpose, the CPU 417 sets values for detecting the background of the banknote in the registers 601–606 of the window comparator 408 shown in FIG. 6.

In such state, a step 1002 starts the first scanning.

FIG. 1 shows a 10,000-Yen banknote placed on the platen. In the first scanning in the mode 1, the window comparator provides output signals "1" in the hatched areas, namely in the watermarked area and the peripheral area.

Since such signals continue in excess of a predetermined number of pixels in the vertical and horizontal directions in the watermarked area, the watermark detection circuit 410 latches an address corresponding to a position (Xc, Yc) and sends the address to the CPU 417.

Thus the CPU 417 can know the approximate value of the center (Xc, Yc) of the banknote.

Then a step 1003 sets the mode 2, in which selectors 411, 413, 415, 416 are set at A, and the address decoder 414 is given following values:

$$\left.\begin{array}{l} RX1 = Xc - T \\ RY1 = Yc - T \\ BXY = 2T \end{array}\right\} \quad (16 \text{ pixels taken as a unit})$$

RX2 = RX3 = RX4 = RY2 = RY3 = RY4 = 0.

In the second scanning in a step 1004, by selecting T approximately equal to 128 mm in the RAM 412, there can be obtained a bit map in which the hatched areas alone are "1" in the broken-lined frame. Said dimension 128 mm is selected because the banknote can be contained in the broken-lined area regardless of the kind or position thereof.

In a step 1005, the CPU 417 detects the exact position and angle of the banknote from said bit map. In this operation the CPU sets the selectors 411, 413 respectively at C, B for freely reading the data in the RAM 412. There is adopted a method of detecting four corners of the banknote, as shown in FIG. 11. More specifically, with the banknote position as shown in FIG. 11, four corners are detected, based on the following:

$$\left\{\begin{array}{l} \max(X) \text{ appears at point D} \\ \min(X) \text{ appears at point B} \\ \max(Y) \text{ appears at point C} \\ \min(Y) \text{ appears at point A} \end{array}\right. \quad (5)$$

and $$\left\{\begin{array}{l} \max(X+Y) \text{ appears at point C} \\ \min(X+Y) \text{ appears at point A} \\ \max(Y-X) \text{ appears at point B} \\ \min(Y-X) \text{ appears at point D.} \end{array}\right. \quad (6)$$

Although the details will not be explained, the conditions (5) and (6), if suitably employed, allow detection of the four corners regardless of the angle of the banknote.

Also, the angle θ in FIG. 1 can be obtained from the equation:

$$\theta = \tan^{-1}\frac{Y_1 - Y_0}{X_1 - X_0}$$

Also, the position of the red stamp mark is determined from the obtained position and angle. Since the banknote can be placed upward, downward, face up or face down, the red stamp mark appears at one of the positions $(X_{s1}, Y_{s1})$ $(X_{s2}, Y_{s2})$ $(X_{s3}, Y_{s3})$ and $(X_{s4}, Y_{s4})$ shown in FIG. 1. These positions can be determined by simple calculations from $(X_0, Y^0)$ and θ.

Then a step 1006 sets the mode 3 for the third scanning, in which the selectors 411, 413, 415 and 416 are respectively set at B, A, B and B.

In the address decoder 414, there are set conditions:

| | |
|---|---|
| $RX_1 = X_{s1}$, | $RY_1 = Y_{s1}$, |
| $RX_2 = X_{s2}$, | $RY_2 = Y_{s2}$, |
| $RX_3 = X_{s3}$, | $RY_3 = Y_{s3}$, |
| $RX_4 = X_{s4}$, | $RY_4 = Y_{s4}$, | and BXY is selected at a number of pixels approximately corresponding to a size of 300 mm which sufficiently cover the red stamp mark shown in FIG. 1.

Also, the registers of the window comparator 408 shown in FIG. 4 are given such values as to generate a signal "1" only in the red color part of the red stamp mark.

Then a step 1007 executes the third scanning, and the output of the window comparator 408 is stored in the RAM 412, in four positions shown in FIG. 1, where the red stamp mark may appear.

Subsequently a step 1008 extracts the red stamp mark by an algorithm to be explained later, and the mark is identified in a step 1009. In the absence of possibility of forgery, namely in the absence of the red stamp mark, a step 1010 executes the fourth scanning, and a step 1012 fixes the toners of four colors Y, M, C and Bk.

On the other hand, if the step 1009 detects the red stamp mark, indicating the possibility of forgery, a step 1011 executes a measure for preventing the forgery. More specifically, a value $FF_H$ is set in the register, which normally stores $00_H$, of the window comparator 408 shown in FIG. 4, whereby the signal $FF_H$ is sent to the printer unit, thus depositing the black toner over the entire surface and disabling proper copying.

In the foregoing description it is assumed that each scanning operation is conducted corresponding to the printing operation of the printer unit, but it is also possible to detect the position of the watermark in a pre-scanning operation if such pre-scanning is conducted.

[Pattern matching]

In the following there will be given a detailed explanation of the pattern matching conducted in the step 1008.

Since a banknote has two red stamp marks respectively on its top and bottom faces, two mark patterns are registered in advance for identifying a banknote.

Figure 12:
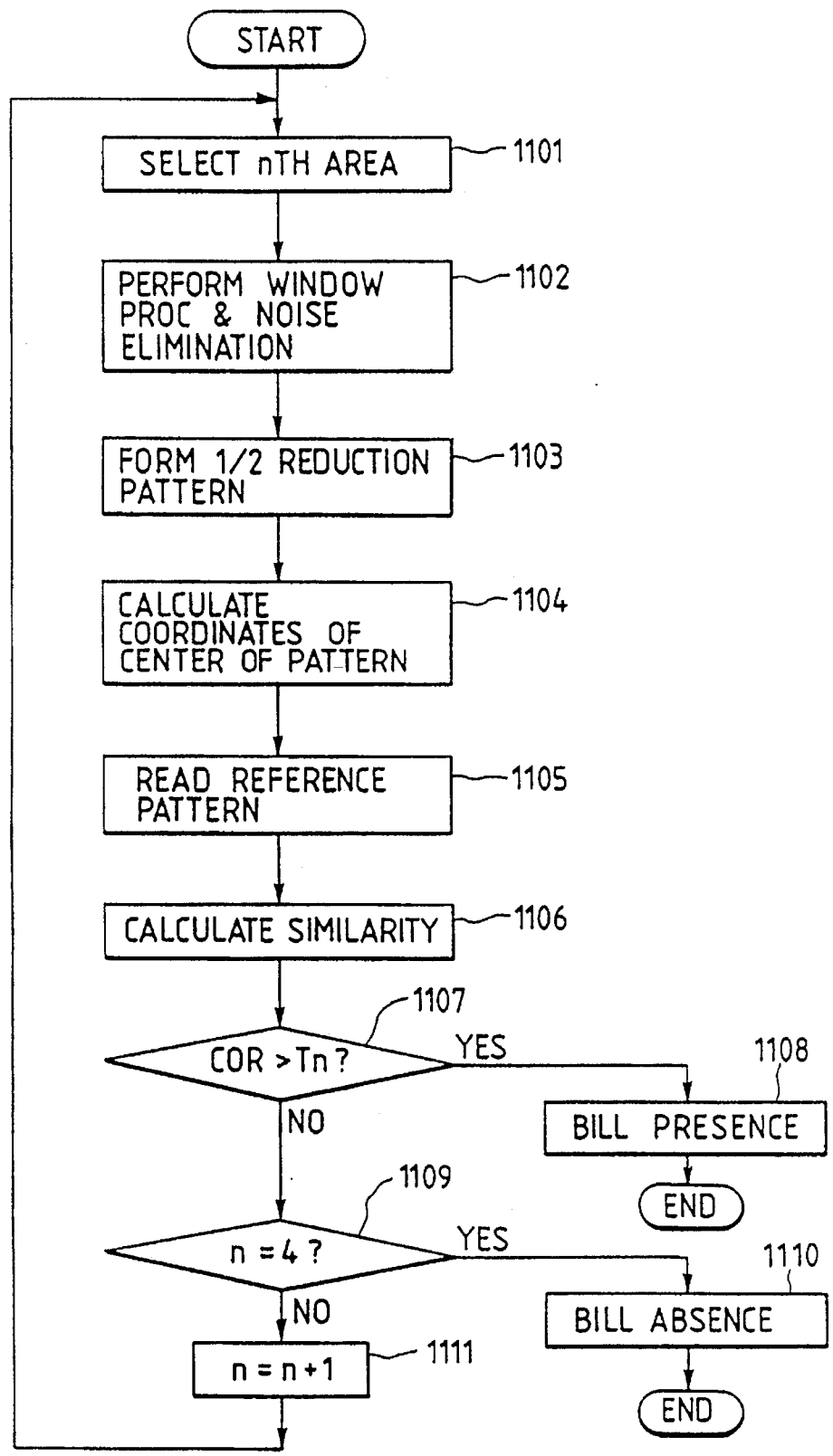

When the data of a predetermined area of the original image are stored in the RAM 412, the CPU 417 executes a pattern matching operation with reference to the content of the RAM 412, according to a flow chart shown in FIG. 12. Now the RAM 412 stores four sets of binary data, called areas 1–4, as candidates for the predetermined area.

At first a sequence starting from a step 1102 is conducted on the data of the area 1. The step 1102 executes a window processing for noise elimination, in a similar manner as the 16×16 block process explained above.

FIG. 13 shows an example of the binary image 1201 of the area 1, wherein each square represents a pixel which can be white, represented as blank, or black, represented as hatched. This image is scanned with a window 1202 of 2×2 pixels, and a new black pixels is defined if the number of black pixels in said window is equal to or larger than 2. This scanning process provides a noise-eliminated pattern 1203 which is vertically and horizontally reduced to ½ in size. The window at the illustrated position, containing only one black pixel, is replaced by a white pixel in 1204.

Then a step 1104 calculates the position of center of gravity of the pattern 1203, through the already known method, by projecting the pattern 1203 in the vertical and horizontal direction.

Then the level of similarity is calculated by standard pattern matching. At first, in a step 1105, a standard pattern registered in advance as a dictionary is fetched from the ROM 418 to the CPU. The standard pattern is the pattern of the red stamp mark of the banknote. However, the simple comparison of the pattern in the step 1103 with said standard pattern does not necessarily provide a satisfactory result since the detected pattern may be rotated by the angle of the banknote on the platen.

Figure 14A:
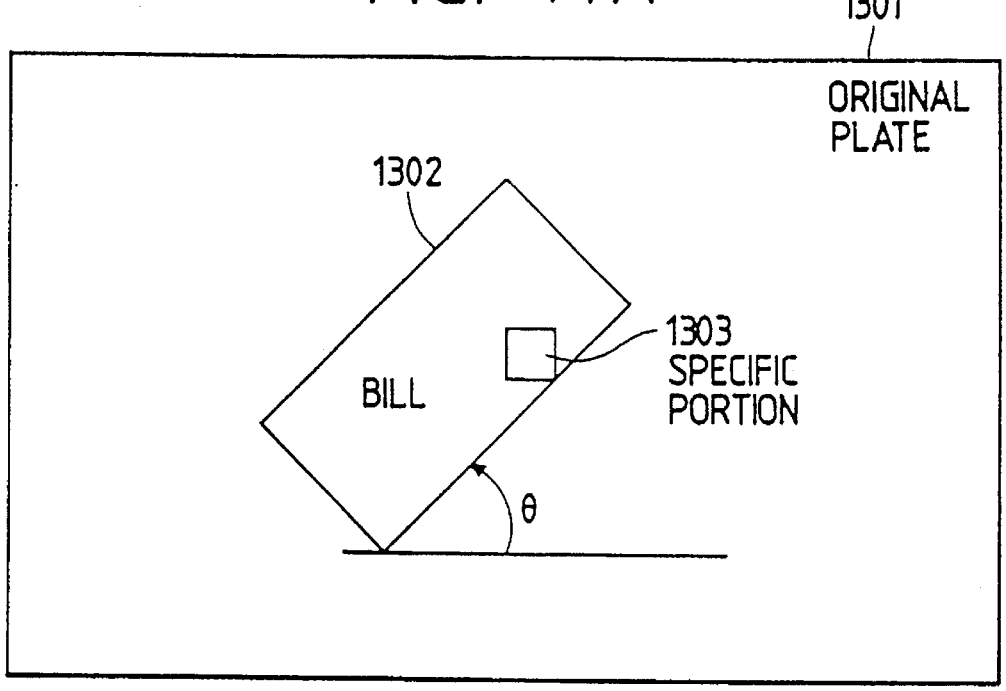
Figure 14B:
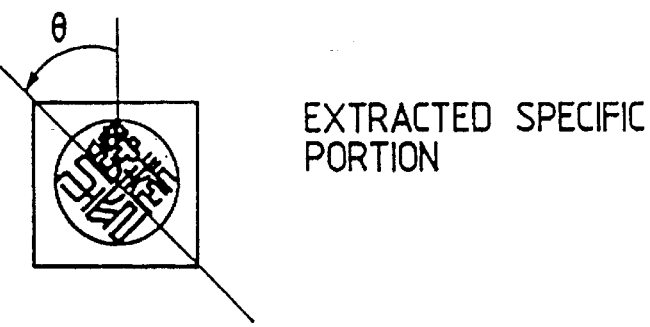
Figure 14C:
Figure 15A:
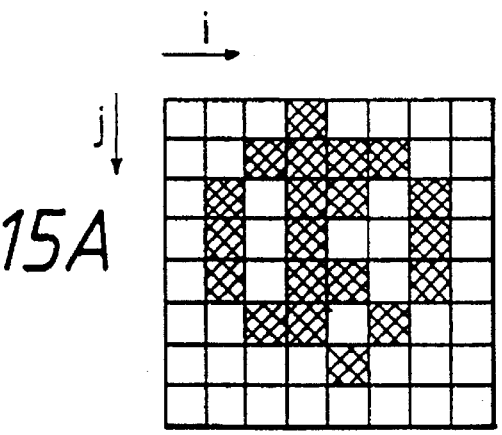
Figure 15B:
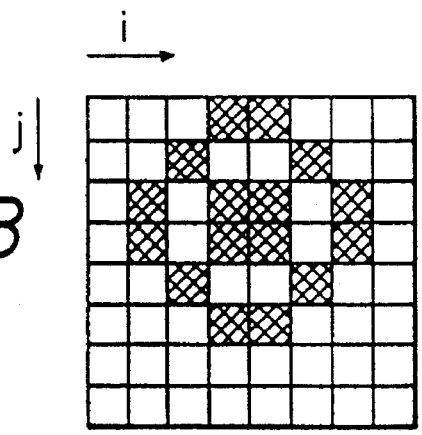

The above-explained situation is shown in FIG. 14. For this reason there may be stored, as the standard pattern, plural patterns obtained by rotating the pattern of the red stamp mark at a pitch of several degrees, and a suitable one selected from said plural patterns. For example, there can be employed 24 patterns obtained by rotating the red stamp mark in a range of 0°–360° at a pitch of 15°, and the calculation of similarity can be conducted with sufficient precision, by selecting one of said plural patterns according to the already detected angle θ of the banknote; namely a pattern of rotation angle of 0° for a range $-8° \leq θ < 8°$, a pattern of rotation angle of 15° for a range $8° \leq θ < 24°$, a pattern of rotation angle of 30° for a range $24° \leq θ < 40°$ and so on.

Since the rotation angle θ of the banknote may be different from the rotation angle of the red stamp mark by 180°, it is necessary to select the standard pattern of 180° when that of 0° is selected. Likewise it is necessary to select the rotation angle 195° at selecting 15°, and the rotation angle 210° at selecting 30°. Thus the calculation of similarity is always conducted twice.

Then a step 1106 calculates the similarity or correlation. This can be achieved using various methods, one of which will be explained in the following. The extracted pattern (a) is represented by B(i, j) while the selected standard pattern (b) of a certain rotation angle is represented by P(i, j), wherein said B(i, j) or P(i, j) assumes a value "1" for a black pixel or "0" for a white pixel. Using the center of gravity $(i_{BC}, j_{BC})$ of the pattern B(i, D) and that $(i_{PC}, j_{PC})$ of the pattern P(i, j), determined in the step 2104 shown in FIG. 12, the correlation of two patterns is determined by the following equation:

$$COR = \sum_i \sum_j P(i - i_{PC}, j - j_{PC}) \oplus B(i - i_{BC}, j - j_{BC}) \qquad (1)$$

wherein ⊕ means exclusive sum of P and B. Thus the equation (1) gives the humming distance of the patterns B(i, j) and P(i, j) when the centers of gravity thereof are matched. The similarity of both patterns is larger as COR increases.

In the present embodiment, in order to improve the reliability of similarity and to minimize the mistaken recognition, the correlation is obtained by the following equation (2) modified from (1):

$$COR = 2 \times \left( \sum_i \sum_j P(i - i_{PC}, j - j_{PC}) \cdot B(i - i_{BC}, j - j_{BC}) - \left( \sum_i \sum_j \overline{P(i - i_{PC}, j - j_{PC})} \cdot B(i - i_{BC}, j - j_{BC}) \right) \right) \qquad (2)$$

wherein "." indicates a logical product, (Anding) and $\overline{P(i-i_{pC}, j-j_{pC})}$ indicates the discrimination of P, adding 2 to COR in case P and B are both black pixels but subtracting 1 from COR in case P=0 and B=1 thereby significantly improving the precision of recognition.

After the calculation of the correlation or similarity COR, a step 1107 compares the COR with a predetermined threshold value Th.

In the case of COR>Th, indicating the presence of the red stamp mark, there is identified the presence of a banknote (step 1108), and the matching operation is terminated.

In the case of COR<Th, indicating the absence of the red stamp mark in the currently processed area, the value of n is increased by 1 if it is smaller than 4, and the pattern matching operation of the steps 1101–1109 is repeated for the next area. If the step 1109 identifies n=4, indicating the absence of the red stamp mark in any of the 1st to 4th areas, there is identified the absence of a banknote (step 1110) and the matching operation is terminated.

Although the present embodiment has been explained in relation to the prevention of forgery of a Japanese 10,000-Yen banknote, it has a wide field of application and is applicable for example to valuable securities, other countries banknotes or newly revised banknotes as long as then contain a relatively wide background and a characteristic pattern such as a red stamp mark or a particular design.

It is also not limited to the copying machine of electrophotographic type, but is applicable to those of ink jet type, thermal imaging type, etc. Furthermore, it can be utilized as an additional function for an image scanner or a printer of stand-alone type.

In the present embodiment, the size and position of the original placed on the platen are detected prior to the pattern matching with the pre-registered pattern. In case or an apparatus in which the original is fed continuously to the reader unit equipped with a line sensor, the present embodiment can be applied by reciprocating the original with respect to said reader unit so that the same original can be scanned plural times.

The present embodiment prevents the forgery of a banknote or the like, by detecting the position and angle of the banknote by the background part thereof, thereby identifying a characteristic pattern such as the red stamp mark, and effecting the pattern matching with the pattern.

Thus the present embodiment can securely identify the predetermined image.

[Embodiment 2]

In the following second embodiment of the present invention, there is disclosed a copying apparatus which is made to recognize a predetermined image for example of a banknote or security document for the purpose of attaining the aforementioned objects, and, in case said predetermined image is recognized in the course of a copying operation, is adapted to alter all the copying process or a part thereof, thereby prohibiting the normal copying of the image, thus preventing the forgery of such banknote or security document. It is to be noted, however, that the present embodiment is not limited to an apparatus with an image reading unit, such as a copying machine, but is naturally applicable also to an image forming apparatus in which an object image is given in the form of electrical signals and is formed as a visible image on a recording material such as paper.

The present embodiment will now be explained by an example of a full-color digital copying machine. The structure of such copying machine is shown in FIG. 17 but will not be explained further as it is similar to that shown in FIG. 2.

Figure 16:
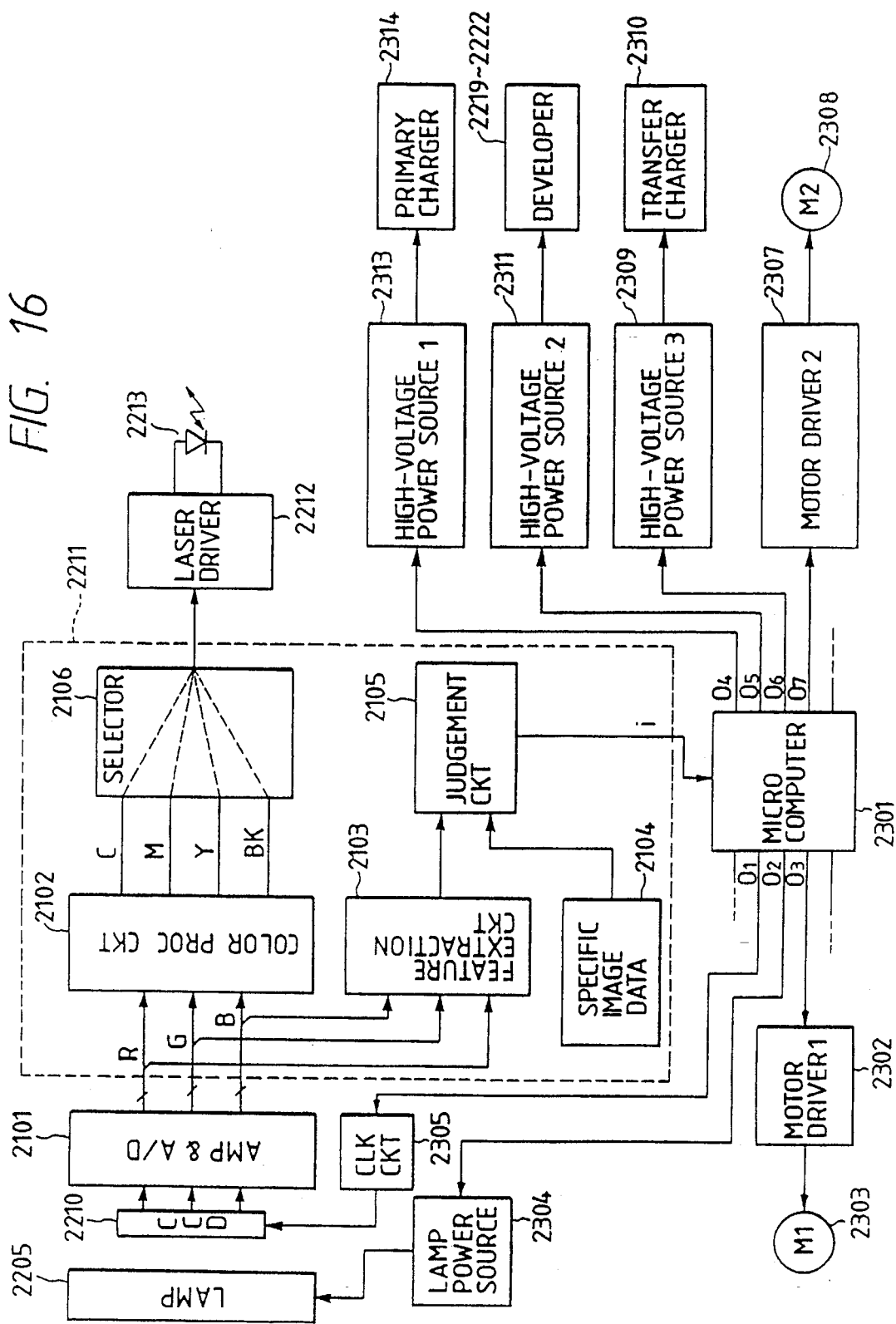
FIG. 16 is a block diagram of a second embodiment.
Figure 17:
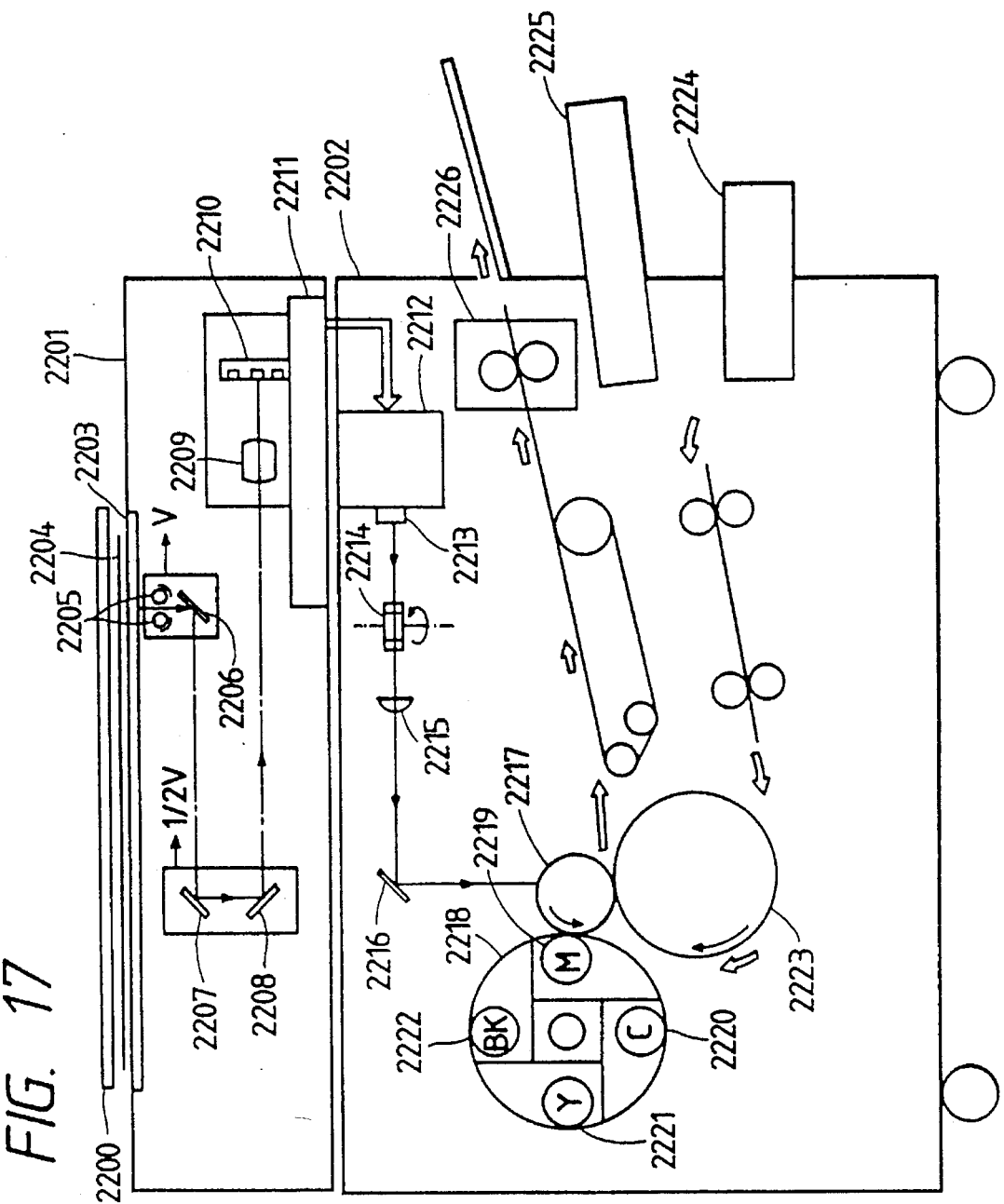
FIG. 17 is a view showing the basic structure of a digital full-color copying machine.

FIG. 16 is a block diagram for explaining an image processing circuit and an image forming sequence of the copying machine shown in FIG. 17, including a circuit for detecting predetermined image data for example of a banknote, in the image data obtained by image reading.

A microcomputer 2301 controls the entire apparatus through input/output ports. Output ports $O_1$–$O_7$ are respectively connected to representative loads required for image formation.

The port $O_1$ is connected to a clock circuit 2305 for generating a clock signal for driving a CCD 2210, and can terminate said clock signal by the state of the port $O_1$.

The port $O_2$ is connected to a lamp power source 2304 for supplying electric power to an original illuminating lamp 2205, and can turn the lamp on and off according to the stage of said port.

The port $O_3$ is connected to a motor driver 2302 for controlling a driving motor for the image reading optical system, and can enable or disable the motor driver 2302 according to the state of said port $O_3$.

The port $O_4$ is connected to a high-voltage power source 2313 for supplying a high voltage to a primary charger, and can turn the power source on and off.

The port $O_5$ is connected to a high-voltage power source 2311 for supplying the developing bias voltage to one of the developing stations 2219–2222 placed in the developing position, and can on/off control the power source.

The port $O_6$ is connected to a high-voltage power source 2309 for supplying a high voltage to a transfer charger 2310, and can turn the power source on and off.

The port $O_7$ is connected to a driver 2307 for a driving motor 2308 for sheet feeding. Driving motor 2308 drives belts and rollers for sheet feeding, through various transmission systems.

In the following there will be explained an image signal system.

The image of an original illuminated by the lamp 2205 is formed on the CCD 2210 through the optical system shown in FIG. 17, and is converted into electrical signals of red (R), green (G) and blue (B) in synchronization with the clock signal generated by the clock circuit 2305.

These electrical signals are amplified in a block 2101 and converted into digital signals by A/D converters. The digital image signals R, G, B are subjected to a masking process for CCD filtering and color correction for developing toners and a color processing such as undercolor removal (UCR) in a color processing circuit 2102, and converted into toner amount signals C, M, Y, Bk. The toner amount signals are selected, one by one, by a selector 2106 in scanning operations of corresponding colors, and are supplied to a laser driver 2212 for driving a laser 2213, thereby irradiating the photosensitive drum and forming thereon a latent image corresponding to the signals.

At the same time, the digital image signals R, G, B are supplied to a feature extraction circuit 2103 for extracting a feature of the input image according to a predetermined algorithm.

The feature extraction is conducted for example based on a particular pattern or the color distribution of the input image. The feature data (for example binary pattern data or color component ratio data) and the image for which copying is to be prohibited are processed by the same algorithm and are compared with already extracted predetermined image data 2104 in a judgment circuit 2105, and the result of the judgment is supplied to an input port or an interruption port of the microcomputer 2301. The predetermined image data can be stored for example in a ROM or a RAM. The judgment of the judgment circuit 2105 can be conducted in a similar manner as in the foregoing embodiment 1. The microcomputer 2301 can know the presence of an image for which copying is prohibited by inspecting the level of the input port or by the generation of an interruption process.

When the presence of such image is identified, the microcomputer 2301 deactivates all or a part of the driving units necessary for image formation.

For example the port $O_1$ can be controlled to terminate the generation of the clock signal from the CCD clock circuit 2305, thereby terminating the generation of image signal and thus prohibiting the copying operation.

Also the port $O_2$ may be used for controlling the lamp power source 2304 thereby turning off the lamp 2205, whereby the image signal thereafter becomes equivalent to the signal obtained from a totally black original.

Also the port $O_3$ may be controlled to interrupt the drive of the reading optical system, whereby the image signal thereafter continues to be generated at a position where said optical system is stopped, and the copying operation is thus hindered.

The port $O_4$ may be controlled to terminate the power supply to the primary charger, whereby the static potential is not generated on the photosensitive drum thereafter and a flat image is thereafter obtained regardless of the color of image development.

The port $O_5$ may be controlled to terminate the power supply to the developing unit, whereby the latent image is not developed thereafter.

The port $O_6$ may be controlled to terminate the power supply to the transfer charger, whereby the developed image is not transferred onto the recording sheet, and the copying operation is therefore prohibited.

The port $O_7$ may be controlled to stop the sheet feeding system, whereby the subsequent image forming steps are terminated. Also a mechanism for detecting sheet jamming is generally activated, so that the entire electrophotographic process is suspended.

The unit to be deactivated is determined according to the characteristics of the apparatus. The present embodiment has been explained by an apparatus employing an electrophotographic process, but it is not limited to such apparatus. For example, in case of an ink jet recording apparatus, there can be controlled the ink supply or the electric power supply to the ink jet recording head. The unit to be deactivated is determined in consideration of various factors, in order to avoid eventual damage to the apparatus, possibly caused by the deactivation of such unit in the apparatus.

As explained in the foregoing, the copying of for example, a banknote can be prevented by deactivating all or a part of the image forming apparatus as soon as the feature of a predetermined pattern is detected in the image read in the course of copying operation.

[Embodiment 3]

Figure 18:
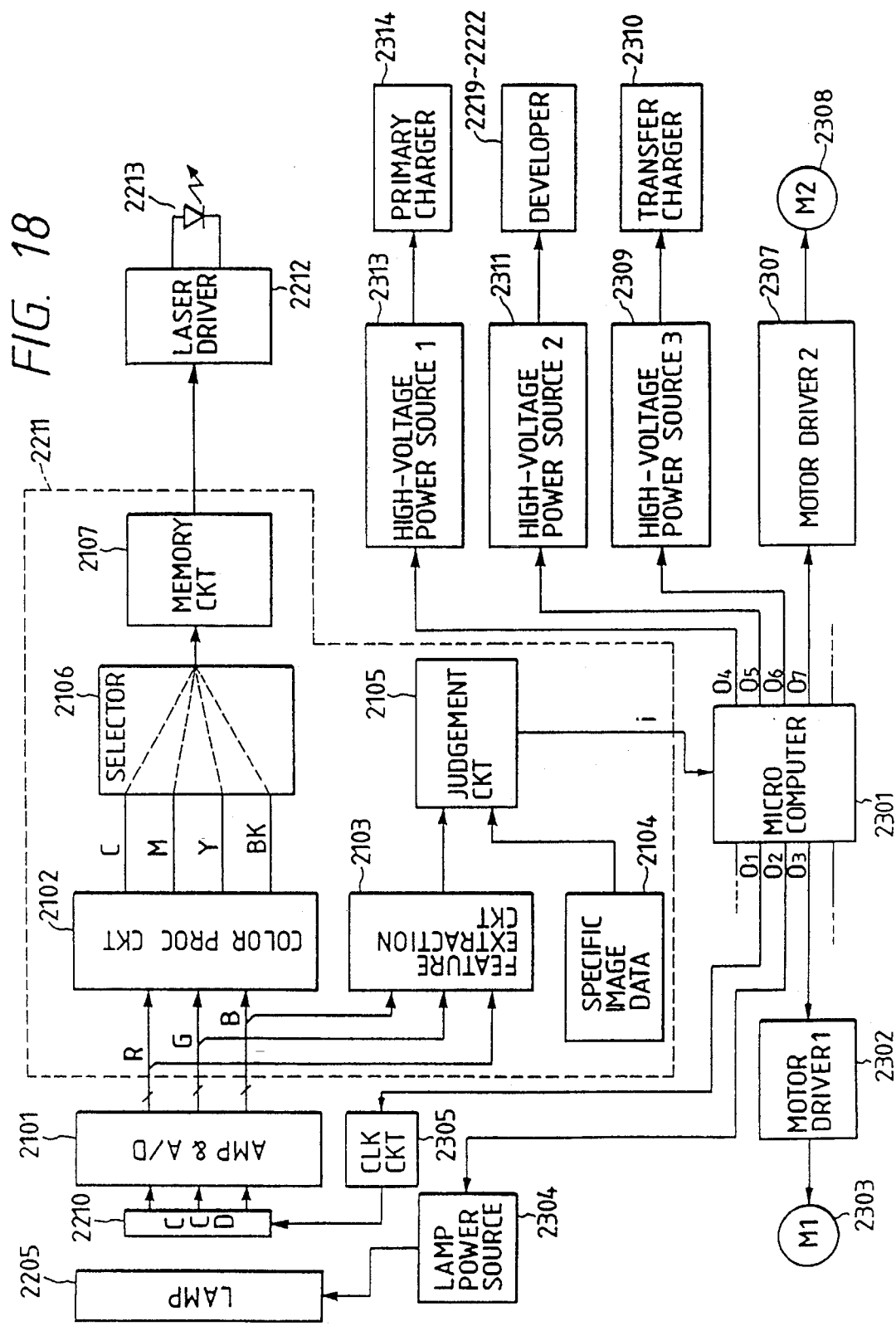
FIG. 18 is a block diagram of a third embodiment.

FIG. 18 is a block diagram of a third embodiment of the present invention, which is different from the second embodiment in the presence of a memory circuit 2107 behind the selector 2106 for the toner amount signals.

In the second embodiment in which the image signal processing as a part of image formation is conducted simultaneously with the detection of the predetermined pattern, the image of the predetermined pattern may be formed if the detection requires time depending on the method therefor.

In such case, the prevention of forgery can be achieved by delaying the image signal by a certain time, by means of the memory circuit 2107 provided in front of the laser driver. The memory circuit requires a capacity for delaying the image data by a period from the entry of the image data into the feature extraction circuit 2103 to the output of result of judgment from the judgment circuit 2105.

As explained in the foregoing, the present embodiment allows to prevent the forgery of banknotes, security documents or the like by providing a copying apparatus, particularly a full-color copying apparatus, with means for recognizing predetermined image of such banknote or security document, effecting the recognition of the image in the course of copying operation, and deactivating all or a part of the image forming apparatus in case all or a part of the original image to be copied is said predetermined image.

[Embodiment 4]

Figure 19:
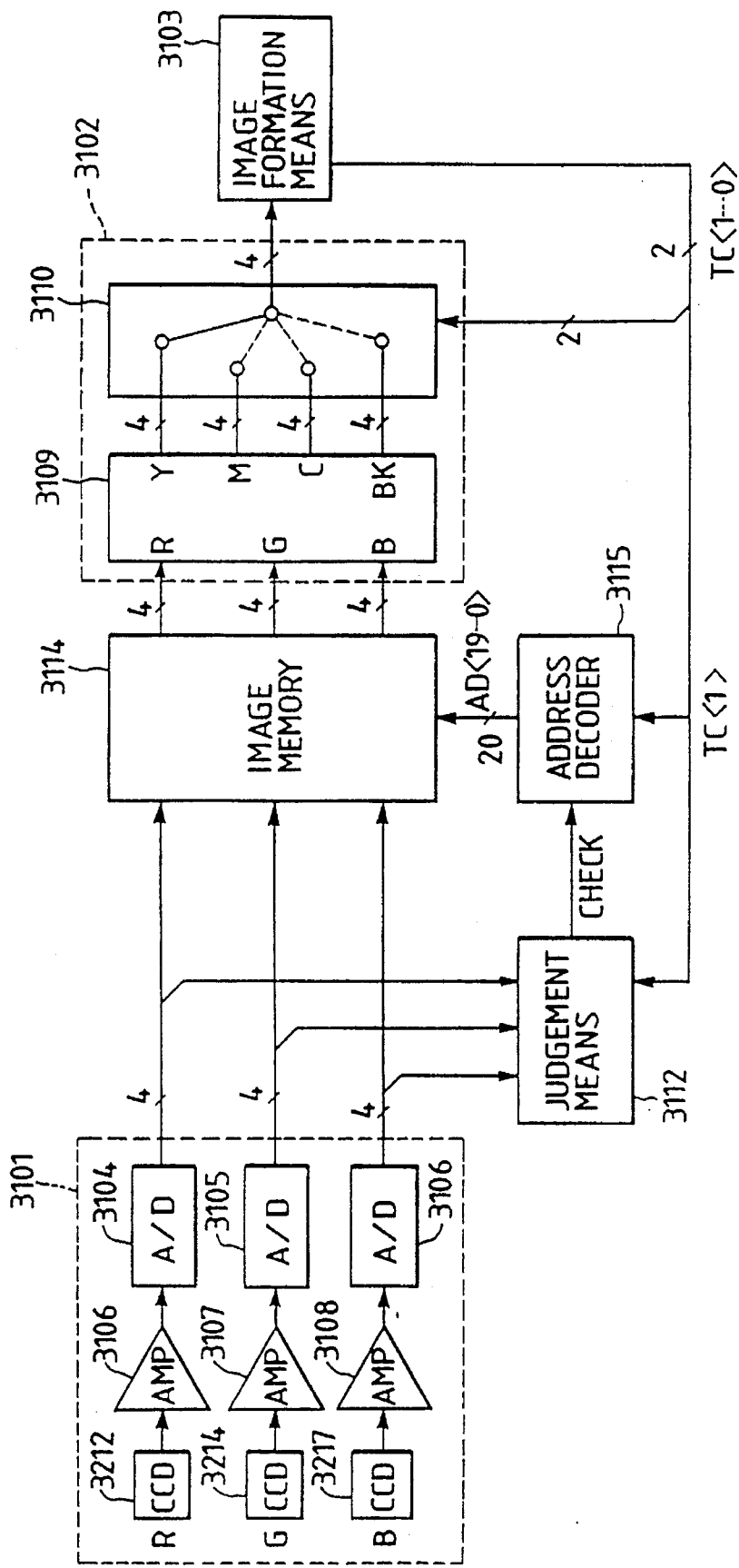
FIG. 19 is a block diagram of a fourth embodiment.

FIG. 19 is a block diagram of a fourth embodiment of the image forming apparatus of the present invention. In image reading means 3101, red (R), green (G) and blue (B) images are respectively read by CCD's 3212, 3214, and 3217, and the obtained analog signals are amplified by amplifiers 3106, 3107, and 3108, and converted by A/D converters 3104, 3105, and 3106 into digital signals of 4 bits for each or R, G, and B.

There are also shown an image memory 3114 for storing 4-bit data for R, G, and B released from the image reading means 3101; image processing means 3102 composed of a color conversion unit 3109 and a selector 3110; image forming means 3103; judgment means 3112; an address decoder 3115; a 2-bit signal TC<1,0> consisting of an upper bit TC<1> and a lower bit TC<0> for designating signals Y, M, C, and Bk; a judgment signal CHECK; and an address signal AD<10,0>.

The function of the above-explained units is as follows.

The image signals R, G, and B read by the image reader means 3101 are sent to predetermined original judgment means 3112 and also stored in an image memory 3114.

The read/write addresses of the memory 3114 are controlled by address data 3115, and the image signals read from the image memory 3114 are sent to signal processing means.

In the signal processing means 3102, color conversion means 3109 calculates signals Y, M, C, and Bk from the signals R, G, and B, and one of the signals Y, M, C, and Bk is sent, by a selector 3110, to image forming means 3103.

On the other hand, the predetermined original judgment means 3112 discriminates whether the input image is the predetermined image according to an already known method, and sends a judgment signal, indicating the result of the discrimination, to the address decoder 3115.

Address decoder 3115 controls the read/write addresses of the image memory 3114 according to the judgment signal, and effects variation of image magnification, formation of an oblique image, formation of a mirror image, etc., on at least one of the Y, M, C and Bk colors by varying the control of the address decoder 3115 at the signal reading from the image memory 3114. Since such image processing as to be applied to all the colors for obtaining a proper output image, so that the prevention of forgery of banknote or the like can be achieved.

As an example, the signals R, G, B are stored in the image memory 3114 and read therefrom, with the address decoder 3115 being so controlled as to obtain a same-sized output, and converted by the color conversion means 3109 into signals Y and M which are sent in succession to the image forming means 3103.

For the signals C and Bk, the address control at the reading of signals R, G, and B from the image memory is modified, by the control of the address decoder 3115 according to the result of the judgment means 3112, so as to vary the magnification of the images C and Bk.

Thus the image obtained by the image forming means 3103 based on the Y and M signals of same size and the C and Bk signals of modified magnification is significantly different from and is easily distinguishable from the predetermined image of which copying is prohibited, and the prevention of forgery can be achieved in this manner.

It is also possible to control the address decoder 3115 by a CPU in the image forming means 3103 so as to displace the image start position, thereby displacing the C and Bk images with respect to the Y, M images and enabling one to distinguish the copied image from the original image.

It is furthermore possible to control the address decoder 3115 by the CPU of the image forming means 3103 to generate random addresses for example in the reading of the C and Bk images, whereby the C and Bk images become totally different from the original images and the forgery of a banknote or the like can therefore be prevented.

Figure 20:
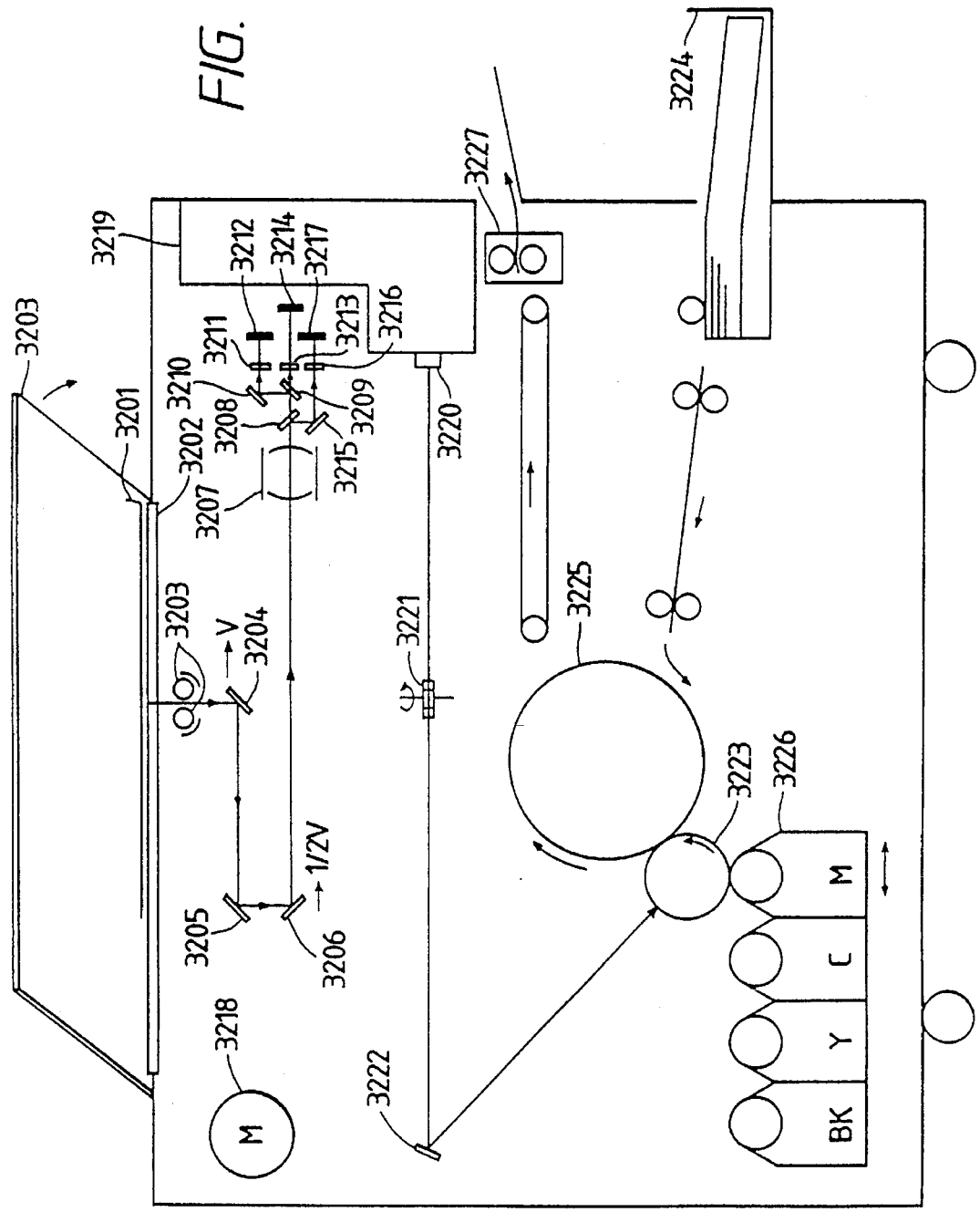
FIG. 20 is a schematic view of said fourth embodiment.

FIG. 20 is a schematic view of an image forming apparatus constituting an embodiment of the present invention.

This image forming apparatus reads the three primary color components of red, green and blue of the original image in the form of electrical signals, calculating, from said signals, the signals of magenta, (M), cyan (C), yellow (Y) and black (Bk), and recording these signals in succession on a recording sheet.

An original document 3201 to be read is placed, with the image bearing face downwards, on a platen glass plate 3202 and maintained in position by a pressing plate 3203. Original 3201 is illuminated by an illuminating system 3203, and the reflected light is guided by mirrors 3204, 3205, and 3206 and a lens 3207, and is split into three light beams by means splitters 3208 and 3209. The first light beam is guided through a mirror 3210 and a R-component passing filter 3211 and is focused on a R-CCD 3212. The second light beam is guided through a G-component passing filter 3213 and is focused on a G-CCD 3214. The third light beam is guided through a mirror 3215 and a B-component passing filter 3216, and is focused on a B-CCD 3217. The CCD's 3212, 3214, and 3217, composed of line CCD's, are electrically scanned in the direction of array (called main scanning), and also mechanical scanning (sub-scanning) is achieved by moving, by a motor 3218, the illuminating unit 3203 and the mirror 3204 with a speed v, and the mirrors 3205 and 3206 with a speed v/2.

The image signals from the CCD's 3212, 3214, and 3217 are processed in an electrical processing unit 3219, and are used for driving a semiconductor laser 3220, of which light beam scans a photosensitive drum 3223 by means of a polygon mirror 3221 and a mirror 3222. The electrostatic latent image thus formed is developed by a developing unit 3226.

On the other hand, a recording sheet fed from a sheet cassette 3224 is wound on a transfer drum 3225, and receives the transfer of thus developed image.

The developing unit 3226 is composed of four developing stations respectively containing toners of four colors M, C, Y, and Bk, which are switched for image development by lateral movement of the developing unit.

The recording sheet wound on a transfer drum receives 4-color images in 4 turns, then is separated from said drum and is transported to a fixing unit 3227 for image fixation.

Figure 21:
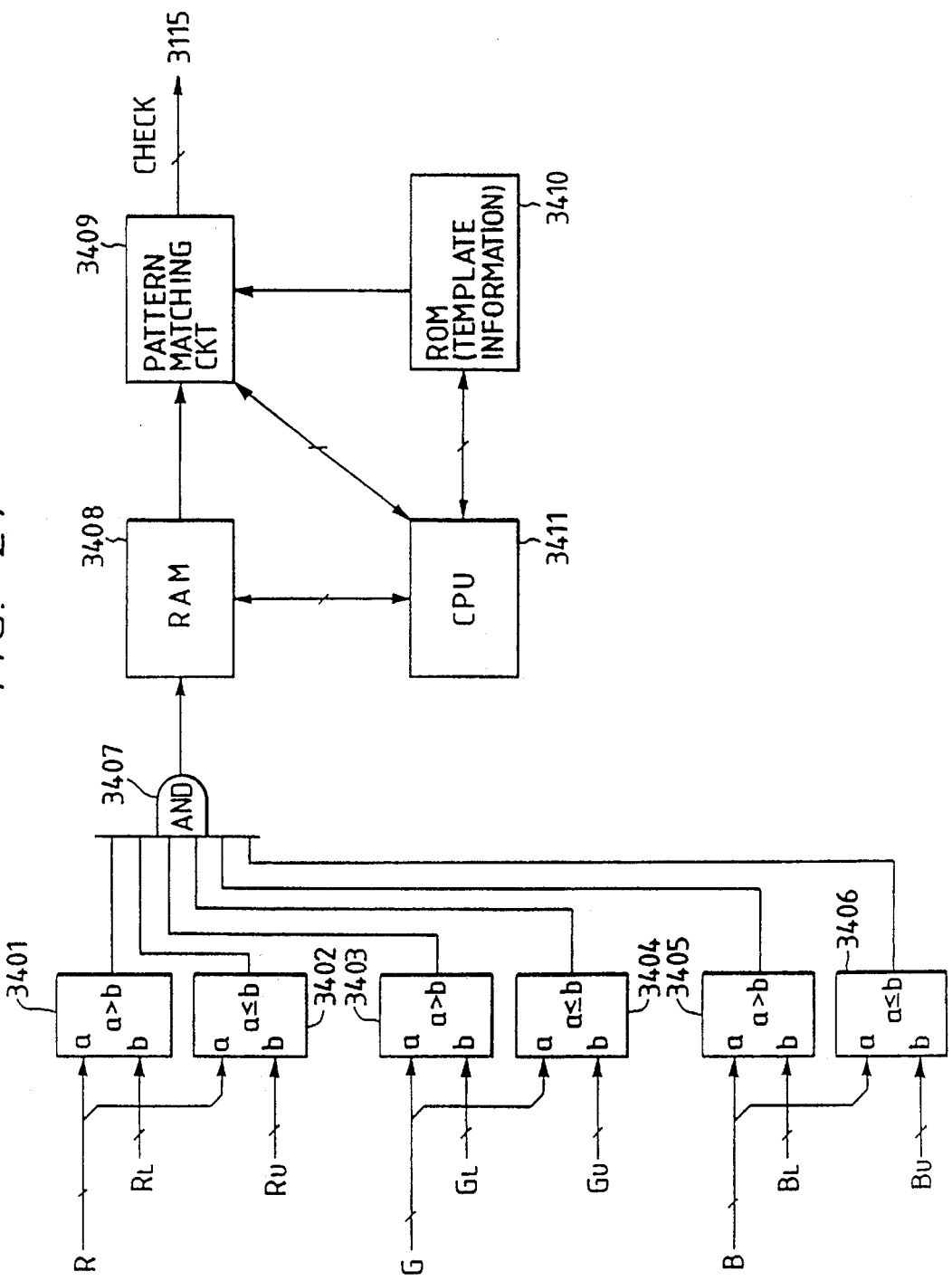
FIG. 21 is a block diagram of judgment means 3114.

In the following there will be explained a predetermined original judgment unit 3112, of which a block diagram is shown in FIG. 21. The R, G, and B signals from image reader means are supplied to comparators 3401–3406 and an AND gate 3407 for judging a predetermined color.

The AND gate 3407 shown in FIG. 21 provides a signal "1" only when:

$R_L < R \leq R_U$ $G_L < G \leq G_U$ $B_L < B \leq B_U$ are satisfied, or otherwise a signal "0", and said signal is stored for each pixel in a RAM 3408. Thus said RAM 3408 separates out or extracts the area of a predetermined color, such as of the red stamp mark in the banknote.

The limit values $R_L$, $R_U$, $G_L$, $G_U$, $B_L$ and $B_U$ are so determined in advance as to define said predetermined color.

The data stored in the RAM 3408 are compared with reference pattern information (hereinafter called template information) stored in a ROM 3410, and there is made a judgment whether these data mutually match.

A pattern representative of the feature of the predetermined original is selected as the template information.

Figure 22:
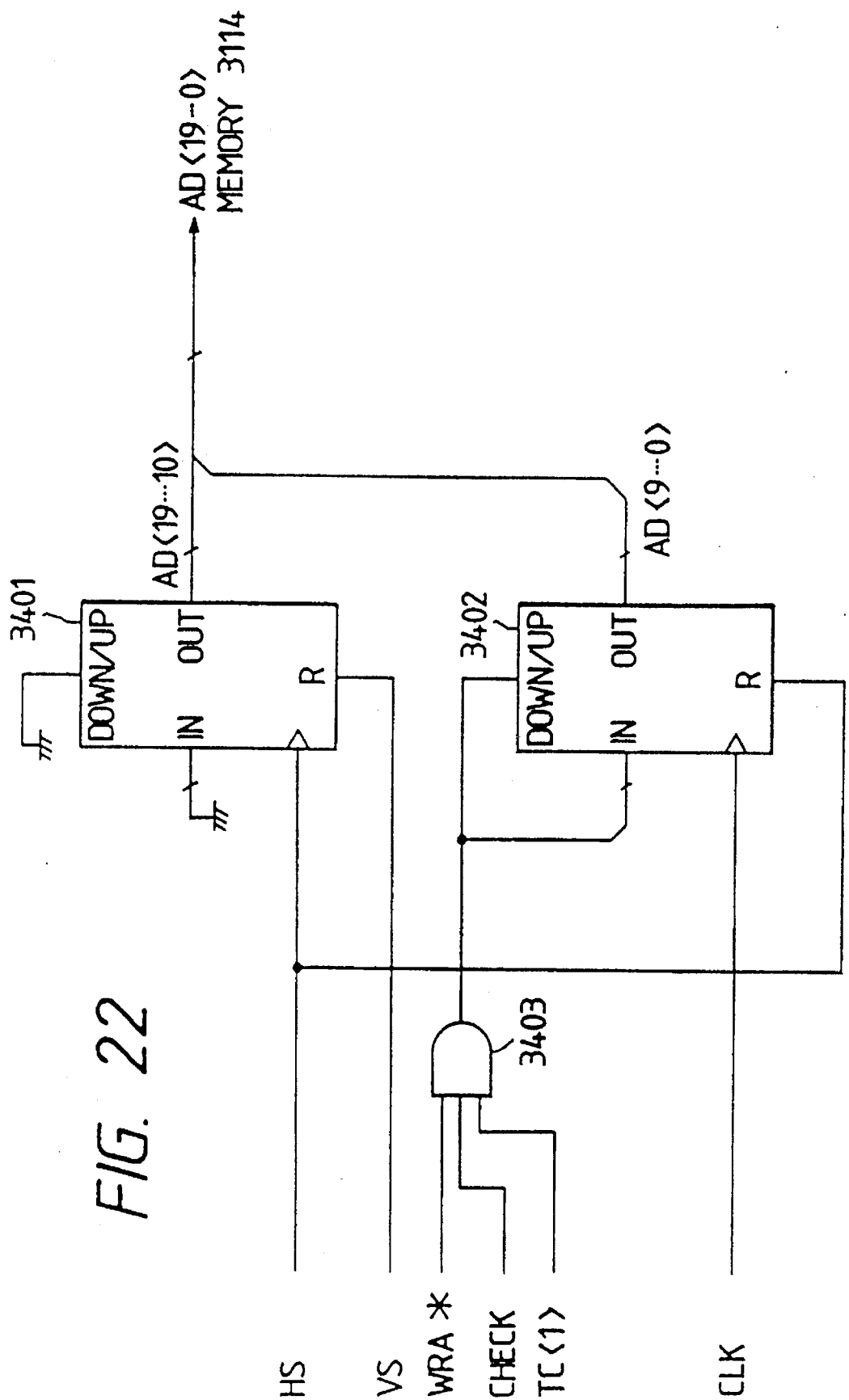
FIG. 22 is a block diagram of an address decoder 3115.

FIG. 22 shows an example of the structure of the address decoder 3115. In FIG. 22 there are shown a counter 3401 for controlling the address of lines in the sub scanning direction; a counter 3402 for controlling the address of pixels in the main scanning direction; a horizontal synchronization signal HS and a vertical synchronization signal VS both supplied from the image forming means 3103 to the counter 3401; a counter control signal WRA* supplied from an unrepresented CPU; a judgment signal CHECK released from judgment means; a signal TC<1> composed of the upper bit of the color designation signal TC<1,0> released from the image forming means 3103 for designating two out of four colors Y, M, C and Bk; and a pixel clock signal CLK.

The counter 3402, for controlling the address of pixels in the main scanning direction, effects a counting operation in response to the clock signal CLK, and is reset by the synchronization signal HS The initial value of the counter is $000_H$ in an up-counting operation, or $3FF_H$ in a down-counting operation, and the up-counting or down-counting is selected according to the output of the AND gate 3403.

The counter 3401, for controlling the line address in the sub scanning direction, effects an up-counting operation from an initial value $000_H$ to $3FF_H$, and is reset by the synchronization signal VS.

The address of the image memory is composed of 20 bits, of which the lower 10 bits are given by the output of the counter 3402, indicating the pixels in the main scanning line, while the upper 10 bits are given by the output of the counter 3401 indicating a line in the sub-scanning direction.

In the following there will be explained an example of image area having 1024 pixels ($400_H$) in the main scanning direction, and 1024 lines ($400_H$) in the sub-scanning direction.

Figure 23:
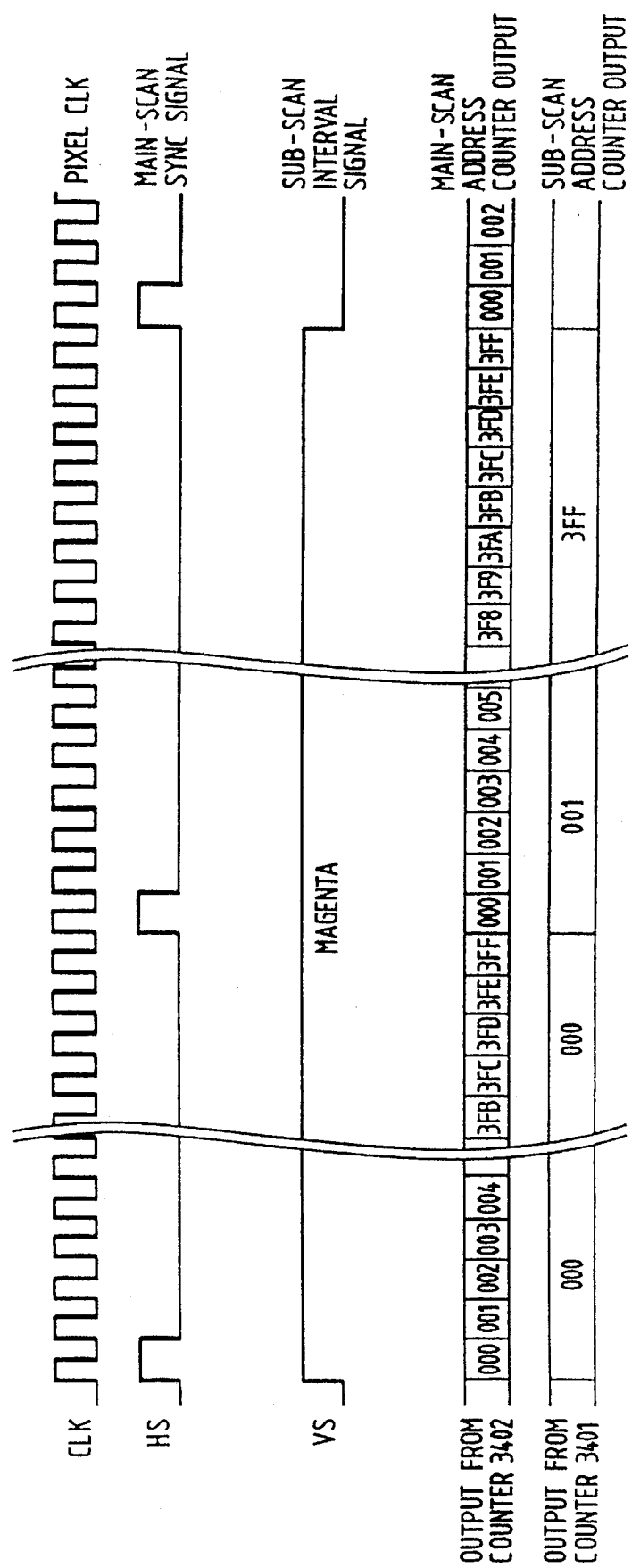
FIG. 23 is a timing chart for counters 3401, 3402.

FIG. 23 is a timing chart of principal synchronization signals.

There are shown the pixel clock signal CLK; the main scanning synchronization signal HS for each line; and the sub scanning section signal VS for 1024 lines. Said signals HS and VS are generated by the image forming means 3103 and are synchronized with the clock signal CLK.

Each of the R, G and B signals is, for example, given 4 bits, and the image memory stores said signals in the form of 12-bit data, of which the upper 4 bits, the middle 4 bits and the lower 4 bits are respectively composed of said R, G and B signals.

The address of the image memory is composed of 20 bits, of which the lower 10 bits indicate pixels in a main scanning line, and upper 10 bits indicate the lines in the sub scanning direction.

Figure 25:
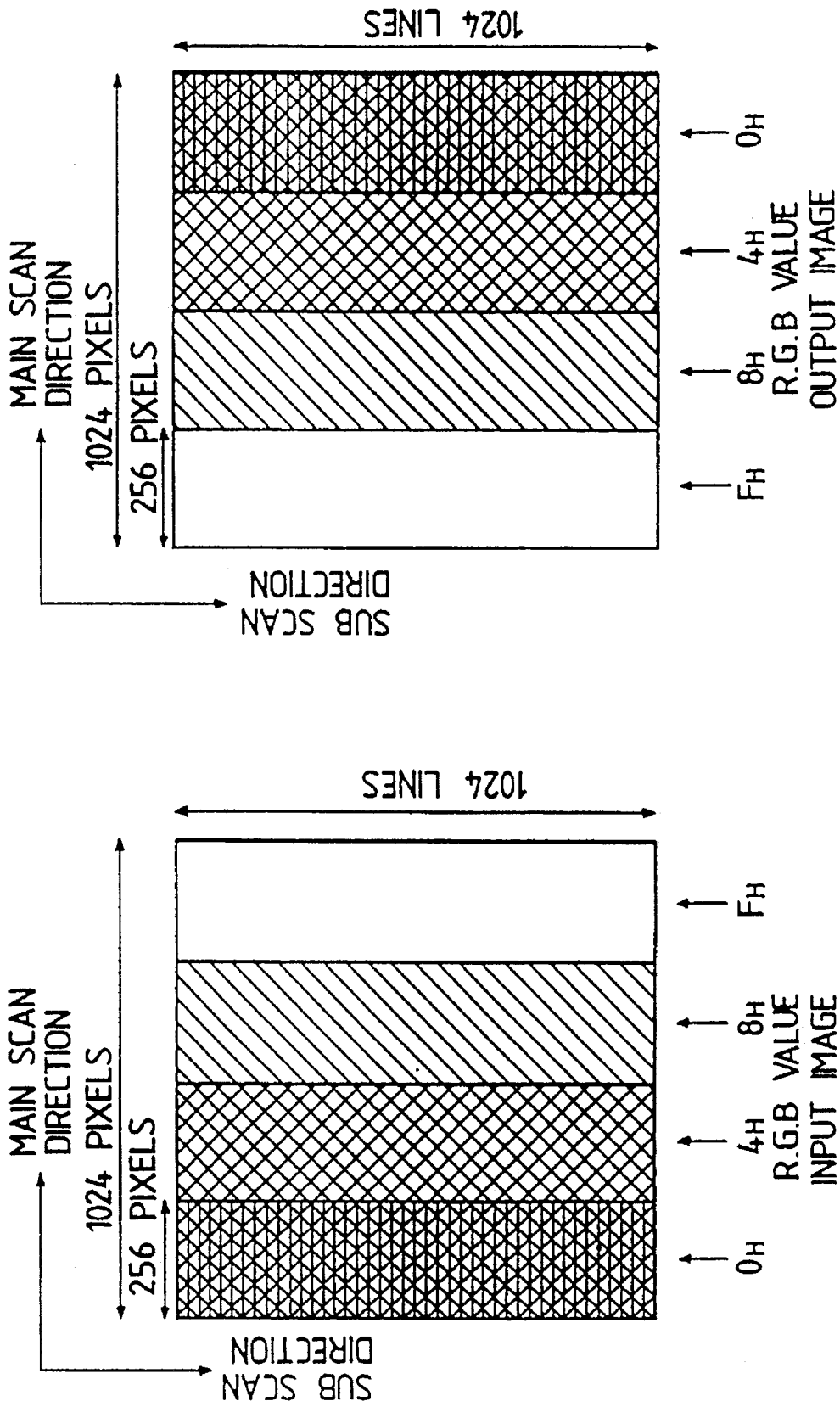
FIG. 25 is a view showing an example of input and output images.

Now let us consider an input image shown in FIG. 25, as an example.

The R, G and B signals obtained from said image are stored in the image memory, according to the address AD<19,0> generated by the address decoder 3115. In this state the counter control signal WRA* sent from the unrepresented CPU to the address decoder 3115 assumes an L-level state to provide an L-level signal from the AND gate 3403, whereby the counters 3401, 3402 execute up-counting operation.

In the image memory 3114, therefore, the R, G, and B data $000_H$ are stored in the addresses $00000_H$–$000FF_H$; the data $444_H$ are stored in the addresses $00100_H$–$001FF_H$; the data $888_H$ are stored in the addresses $00200_H$–$002FF_H$; and the data $FFF_H$ are stored in the addresses $00300_H$–$003FF_H$, whereby the data of the first line are stored at the addresses $00000_H$–$003FF_H$. Since the image is uniform in the sub-scanning direction as shown in FIG. 25, the data of 1024 lines are stored in the addresses $00000_H$–$FFFFF_H$ of the image memory (cf. FIG. 24).

In addition to the storage in the image memory, the R, G, and B signals are supplied to the predetermined original judging means 3112 for discriminating whether the input image is the predetermined image of which copying is prohibited.

Figure 27:
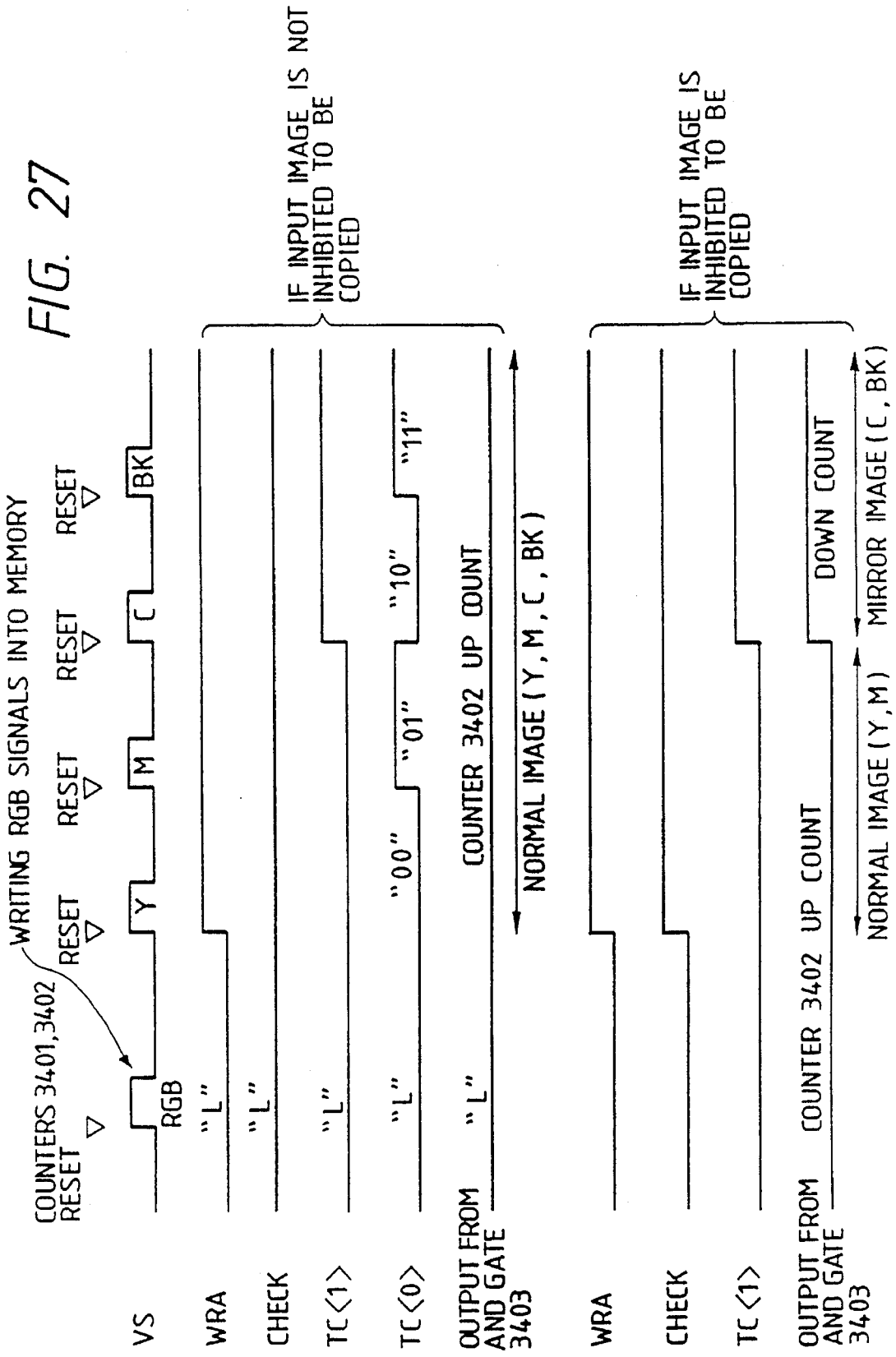
FIG. 27 is a timing chart relating to a counter 4402.

If the input image is identified as not being the predetermined image, the judgment signal CHECK sent from the judging means 3112 to the address decoder 3115 at the data reading from the image memory 3114 assumes an L-level state as shown in FIG. 27, thereby providing an L-level output from the AND gate 3403. Consequently the counters 3401, 3402 execute up-counting operation as in the data storage, whereby the R, G, and B image data stored in the memory are supplied without change to color conversion means 3102, and the input image is reproduced by the image forming means 3103.

Figure 26:
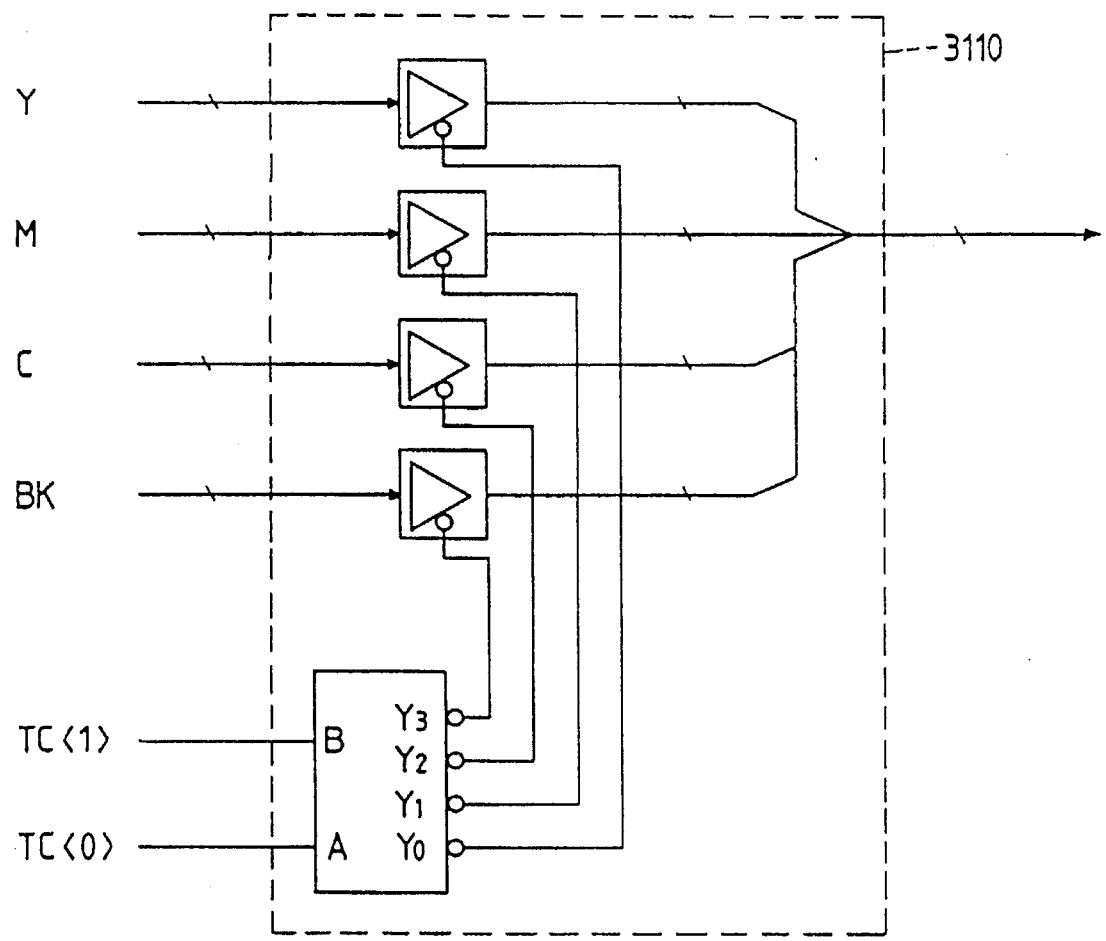
FIG. 26 is a block diagram of a selector 4110.

On the other hand, if the input image is identified as the aforementioned predetermined image of which copying is prohibited, the judgment signal CHECK assumes an H-level state at the data reading from the image memory, as shown in FIG. 27, and the counter control signal WRA of the address decoder 3115 also assumes an H-level state at the data reading from the memory 3114. The signals TC<1> and TC<0> for designating the signals Y, M, C, and Bk sent to the image forming means 3103 are supplied to a selector 3110, and said signal TC<1> is also supplied to an AND gate 3403 of the address decoder. Thus, as shown in FIG. 26, the signal TC<1> is at the L-level state at the selection of the signal Y or M at the selector 3110, or the H-level state at the selection of the signal C or Bk.

Consequently, when the selector 3110 selects the signal Y or M, the signal TC<1> supplied to the AND gate 3403 of the address decoder 3115 assumes the L-level state, thereby providing an L-level output from said AND gate 3403. Thus the counters 3401 and 3402 execute up-counting operation to send normal Y or M image signal to the image forming means 3103. On the other hand, when the selector 3110 selects the signal C or Bk, the TC<1> signal assumes an H-level state, thereby obtaining an H-level output from the AND gate 3403. Consequently the counter 3402 executes a down-counting operation while the counter 3401 executes an up-counting operation, so that, at the reading of the R, G and B signals from the image memory, the address in the main scanning direction, indicated by the lower 10 bits of the address, varies inversely to that at the signal storage while the address in the sub scanning direction, indicated by the upper 10 bits, varies in the same manner as in the signal storage.

Consequently the R, G and B signals in this state constitute a mirror image inverted in the main scanning direction, and the C or Bk signal corresponding to such mirror image is sent to the image forming means 3103.

As a result, the finally obtained image, formed by superposition of the normal Y and M images and the C and Bk mirror, is significantly different from the original image, and the forgery can be prevented in this manner.

Figure 28:
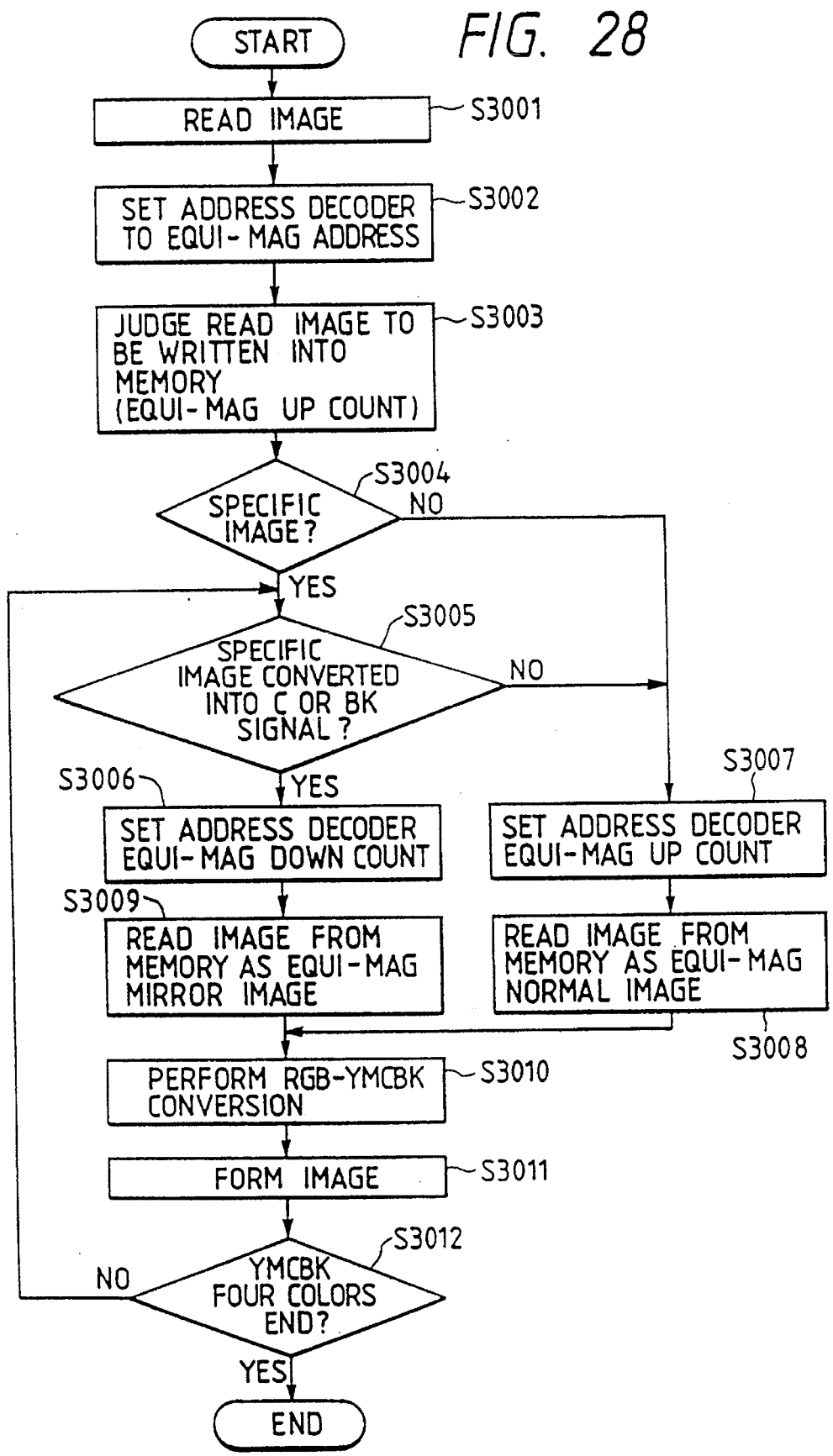
FIG. 28 is a flow chart of the fourth embodiment.

The flow of the above-explained process is shown in FIG. 28.

At first image reading is conducted (step S3001), and the address decoder is set at equal-size addressing (step S3002). The read data are stored in the image memory and are subjected to judgment of pressure of the predetermined image (S3003).

If the input image is identified as not being the predetermined image (S3004), the address decoder is so set as to effect the up-counting operation with the equal size (S3007), and the data reading from the image memory is conducted with the same size (S3008).

On the other hand, if the input image is identified as the predetermined image (S3004), there is discriminated whether the conversion to the C or Bk signal is conducted next (S3005), and, if the next conversion is to the Y or M signal, the sequence proceeds to the step S3007. If the next conversion is to the C or Bk signal, the address decoder is set to effect a down-counting operation with same size (S3008), whereby a same-sized mirror image is obtained in the data reading (S3009). Thereafter the color conversion and image formation are conducted (S3010, S3011), and the sequence is repeated, for all four colors Y, M, C and Bk (S3012).

In the foregoing explanation, the mirror image formation by address control is conducted on cyan and black, but it is enough that it be conducted on at least one, for example only on cyan, or on three colors including magenta.

Also the process to be employed is not limited to such mirror image formation, but other processes such as enlargement, reduction or rotation applied to a particular recording color can provide similar effects.

It is also possible to omit a particular recording color from the recording operation.

The judgment of the predetermined image is not limited to the pattern matching explained above, but can also be done by detection of a predetermined special color.

It is furthermore possible, upon detection of a predetermined image by detection of a magnetic pattern, to modify the process for at least a color, thereby obtaining an image easily distinguishable from the predetermined image.

It is therefore rendered possible to prevent forgery of the predetermined image.

As explained in the foregoing, the present embodiment is designed to modify the process for a particular color, thereby enabling one to distinguish the produced image clearly from the predetermined image and effectively preventing the forgery thereof.

It is also possible to reduce the processing time and to simplify the circuit structure, since the image forming process is modified only in the predetermined color.

As explained in the foregoing, the present embodiment is capable of preventing the forgery of banknotes or the like, by modifying the image forming process for a predetermined color of the predetermined image, while maintaining the color reproducibility for ordinary images.

[Embodiment 5]

In the following there will be explained a full-color digital copying machine constituting a fifth embodiment of the present invention.

Figure 30:
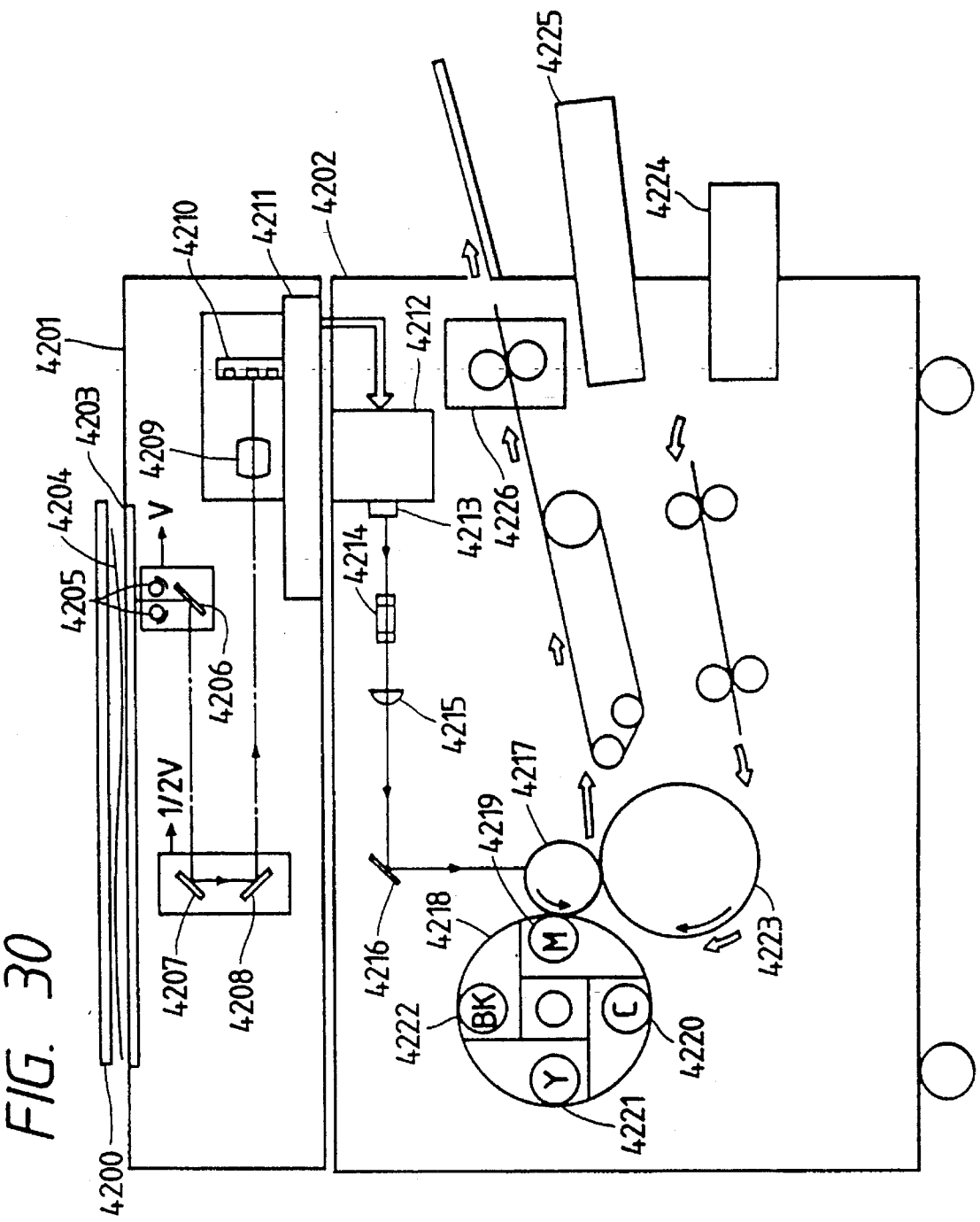
FIG. 30 is a view showing the basic structure of a digital full-color copying machine.

FIG. 30 shows the structure of said full-color digital copying machine of the present embodiment. The structure will not be explained in detail, since it is similar to that of the first embodiment shown in FIG. 2.

Figure 29:
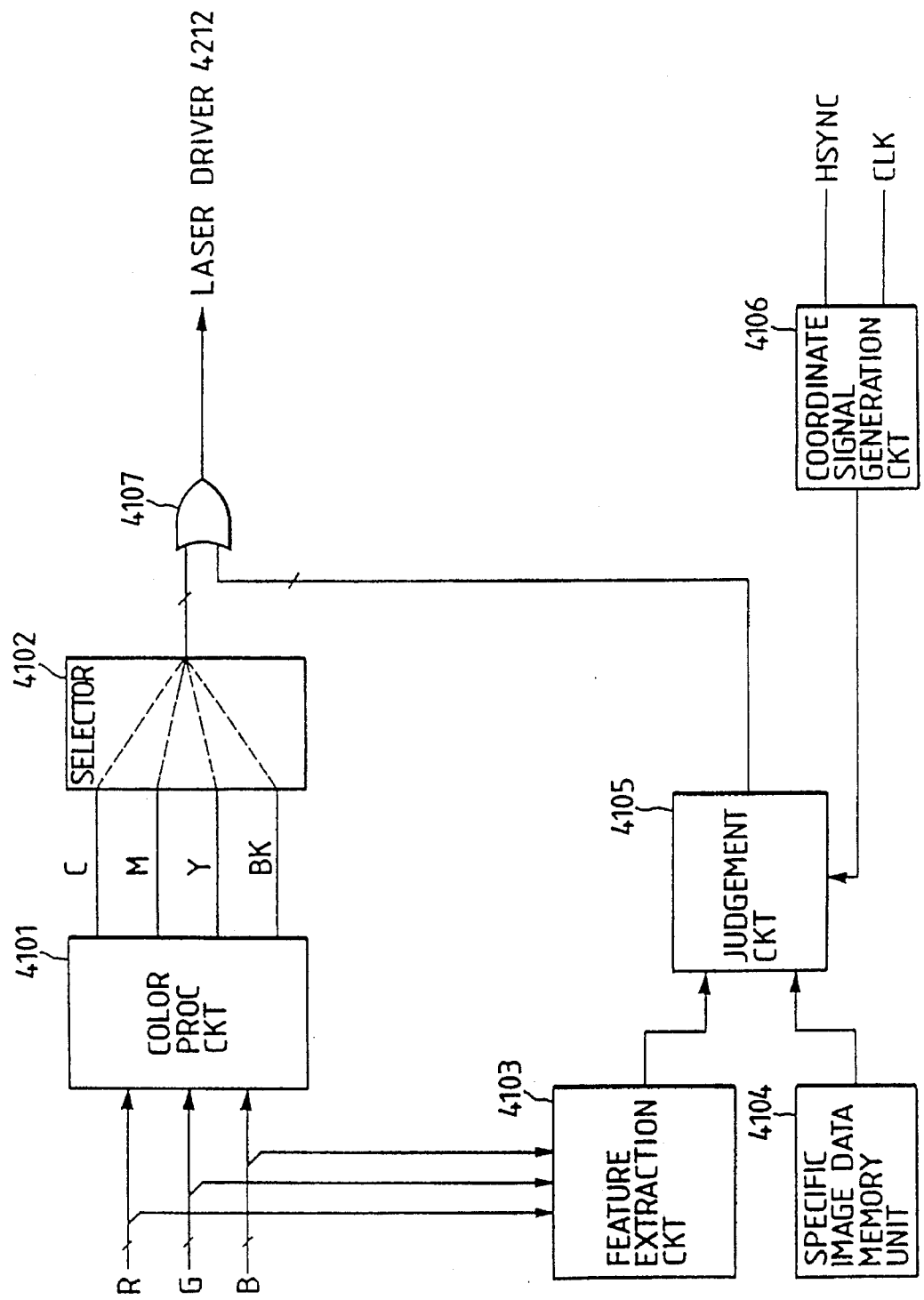
FIG. 29 is a block diagram of a fifth embodiment.

FIG. 29 is a block diagram of a signal processing unit 4211 shown in FIG. 30, of the fifth embodiment.

In FIG. 29, there are provided a color processing circuit 4101 for generating Y, M, C and Bk signals from R, G and B signals; a selector 4102 for selecting one of said Y, M, C and Bk signals; a feature extracting circuit 4103 for extracting the feature of the input image; a predetermined image data memory 4104 storing image data with predetermined features in advance; a judgment circuit 4105 for comparing the data extracted by the feature extracting circuit 4103 with the data stored in the memory 4104 and releasing the result of judgment; a coordinate signal generating circuit 4106 for generating a coordinate signal of the image, based on the pixel clock signal CLK and the horizontal synchronization signal HSYNC; and an OR gate 4107 for sending a toner amount signal to a laser driver 4212 in response to an H-level signal from the judgment circuit 4105 or a color signal from the selector 4102.

The function of the above-explained structure is as follows.

R, G and B color signals obtained from a CCD 4210 are subjected to A/D conversion, and supplied to a color processing circuit 4101 for generating M, C, Y and Bk toner amount signals, corresponding to the reproduced color, from the R, G and B signals, for example by an undercolor removal process for generating the Bk signal, and a masking process for compensating for the spectral characteristics of the toners.

Then one of said C, M, Y and Bk signals is selected by the selector 4102, corresponding to the color of development in the printer.

On the other hand, the digital R, G and B color signals are supplied to the feature extraction circuit 4103 for extracting the feature of the input image according to a predetermined algorithm, based on the presence of a predetermined pattern, a predetermined color or a color distribution in the input image. The judgment circuit 4105 compares the feature data extracted by said extraction circuit 4103 with feature data 4104 extracted in advance by the same algorithm from the image of which copying is to be prohibited, and releases the result of the judgment. In the present embodiment, if the presence of the predetermined image is judged, the judgment signal assumes the H-level state, whereby the OR gate 4107 always releases an H-level signal regardless of the image signal released from the selector 4102 and an image uniformly filled in with the toner is obtained. The copying of the predetermined image is thus prevented.

The coordinate signal generating circuit 4106 generates a coordinate signal of the image, based on the pixel clock signal CLK and the horizontal sync signal HSYNC. Said coordinate signal is supplied to the judgment circuit 4105 for filling in only a predetermined area of the image.

In the following there will be explained the control sequence of the present embodiment, with reference to a flow chart shown in FIG. 31.

When the copying operation is started, a magenta (M) developing station 4219 is selected for image development (step S4301). Then the original image is scanned by a scanner 4201, and R, G and B image signals obtained by a CCD 4210 are supplied to the signal processing circuit 4211 for obtaining, as explained before, the toner signals M, C, Y and Bk, of which the M signal is selected and sent to the laser driver 4212. At the same time the feature of the original image is extracted from the R, G and B signals. The M signal is not gated, however, since the final result of judgment can only be obtained when the scanning operation is completed. Thus the M signal is used for forming a latent image on a drum 4217 through the laser 4213 according to a normal process, and said image is developed and transferred (S4302).

Then a C developing station 4220 is selected for the second color (S4303). However, if the presence of the predetermined image is judged in the magenta scanning (S4304), the judgment circuit 4105 provides an H-level signal to uniformly fill in all the image or a part thereof with the cyan toner (S4306'). Then the sheet is fixed and discharged at this point (S4313) and the copying operation is terminated.

On the other hand, if the magenta scanning identifies the absence of the predetermined image (S4304), there is conducted ordinary copying control, wherein the cyan toner is used for development and transferred corresponding to the image signal (S4305). The judgment of the predetermined image is then conducted again. It is also possible to effect the judgment only in the magenta color scanning and to unconditionally effect the copying operations for Y and Bk colors without the judgment in the cyan color scanning, but the probability of detection can be improved by repeating the judging operation. It is also possible to expand the range of detection or to improve the certainty of detection, for example by varying the condition of feature extraction or the condition of judgment, or the detected pattern itself, from the detection in the magenta color scanning.

Also in the yellow color copying operation, the result of judgment obtained in the cyan color scanning (S4307) is used for controlling the Y signal and the corresponding copying operation (S4308 and S4309). Also in the black color copying operation, the result of judgment obtained in the yellow color scanning (S4311) is used for controlling the Bk signal and the corresponding copying operation (S4312 and S4313'). The final black color copying operation is conducted in normal manner without judgment, because the result of judgment in the scanning operation cannot be reflected in the copying operation.

Figure 31:
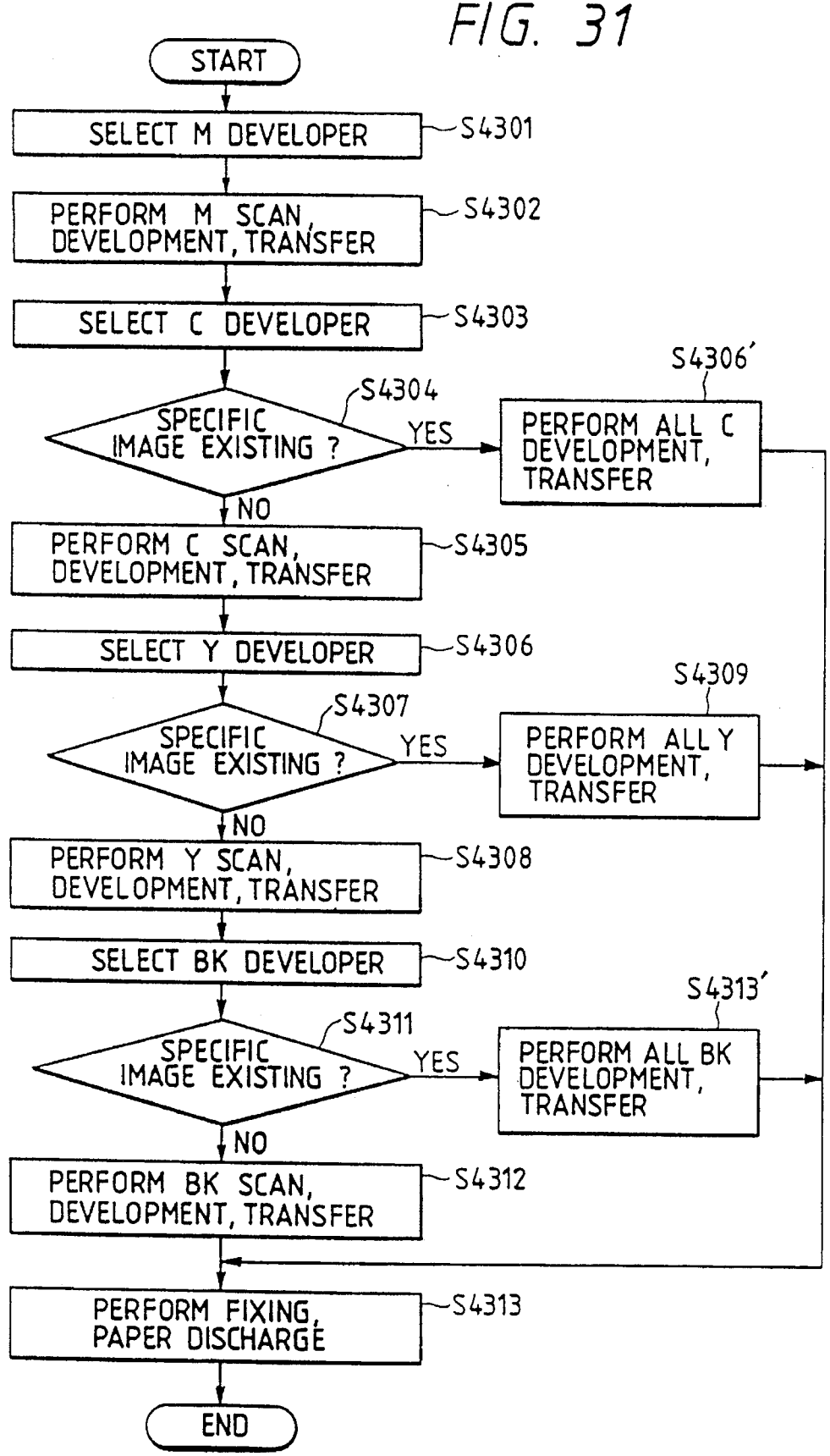
FIGS. 31, 32A, 32B and 33 are flow charts of the control sequence of the fifth embodiment.

The control sequence shown in the flow chart in FIG. 31 is featured by a fact that the prohibition of copying can be achieved without hindering the ordinary copying operation.

Figure 32A:
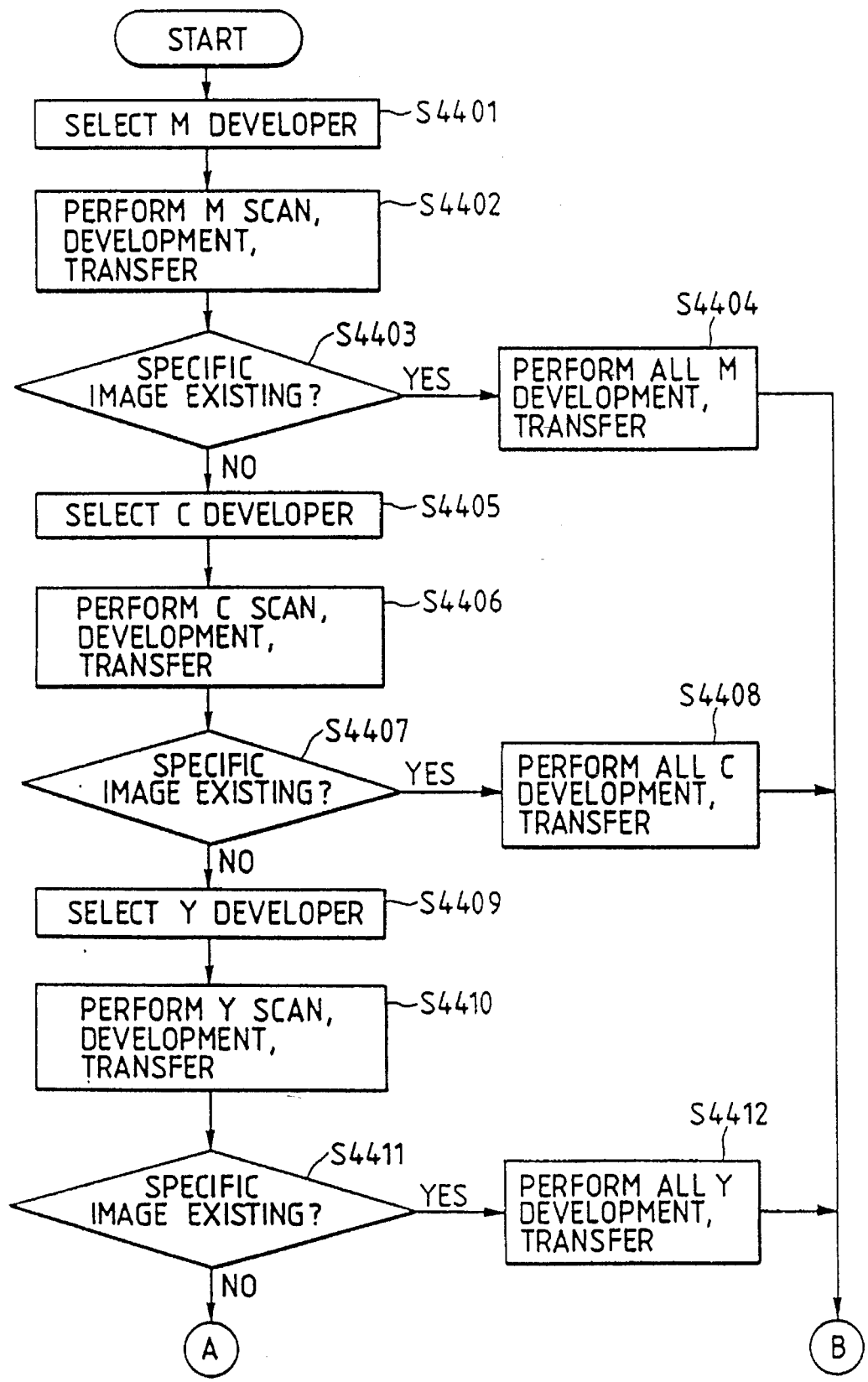
Figure 32B:
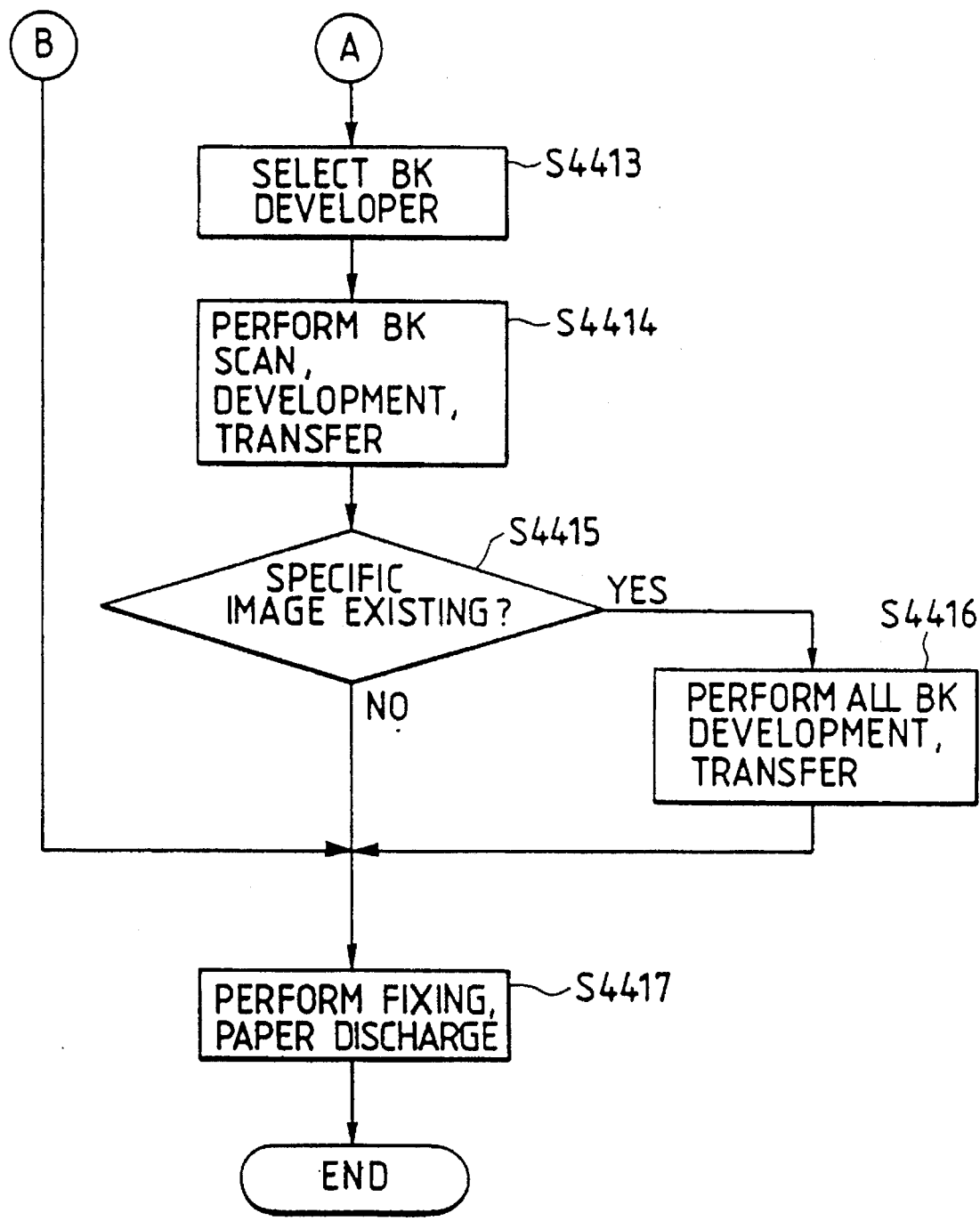

FIG. 32 is a flow chart showing another control sequence different from that shown in FIG. 31. In this flow chart, the developing station is not selected under the result of judgment is obtained, and, if the presence of the predetermined image is identified, the uniform toner deposition is conducted with a color same as that of the scanning operation in which said judgment is made. This sequence can improve the certainty of judgment since the judgment can be conducted four times at maximum (S4403, S4407, S4411, and S4415). This control sequence is suitable for an apparatus in which the result of judgment can be obtained relatively rapidly.

In the control sequences shown in FIGS. 31 and 32, the entire area of image is uniformly filled in with the toner when the presence of the predetermined image is identified, but it is also possible to effect such uniform toner deposition only in a desired area of the image, utilizing the coordinate signal generating function as already explained in relation to FIG. 29.

Figure 33:
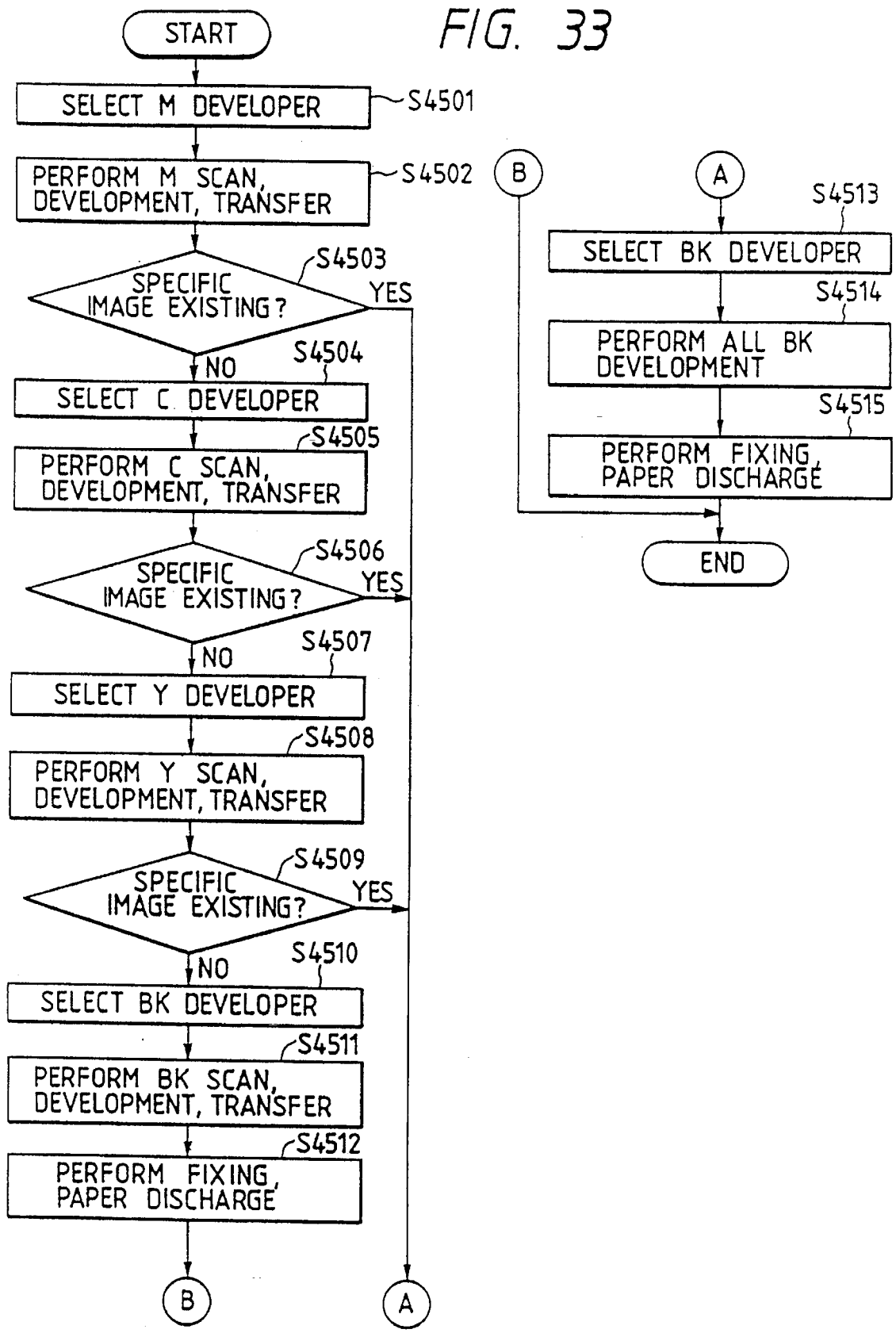

FIG. 33 shows another control sequence in which the image is uniformly filled in with the black toner in case the presence of the predetermined image is identified (S4503, S4506, and S4509).

This sequence is featured by a fact that the image can be completely filled in with the black irrespective of the toners of other colors deposited before the result of judgment is obtained.

Thus the predetermined image can be erased with black color even if the judgment in the scanning operation for M, C or Y color is mistaken.

As explained in the foregoing, the present embodiment can prevent the forgery of banknotes, security documents, etc., by providing the copying apparatus, particularly the full-color copying machine, with means for recognizing the predetermined image of the banknote or security document, effecting the recognition of image in the course of copying operation, and, if the original image to be copied or a part thereof is identified as the predetermined image, uniformly filling in the entire area of the copy sheet or a part thereof with the toner employed in the copying operation or the toner of a predetermined color, thereby preventing the forgery.

In case the predetermined image is identified, the result of said identification may be shown on a display unit, in order to inform the operator, in advance, that a totally or partially filled-in image is going to be produced.

[Embodiment 6]

Figure 34:
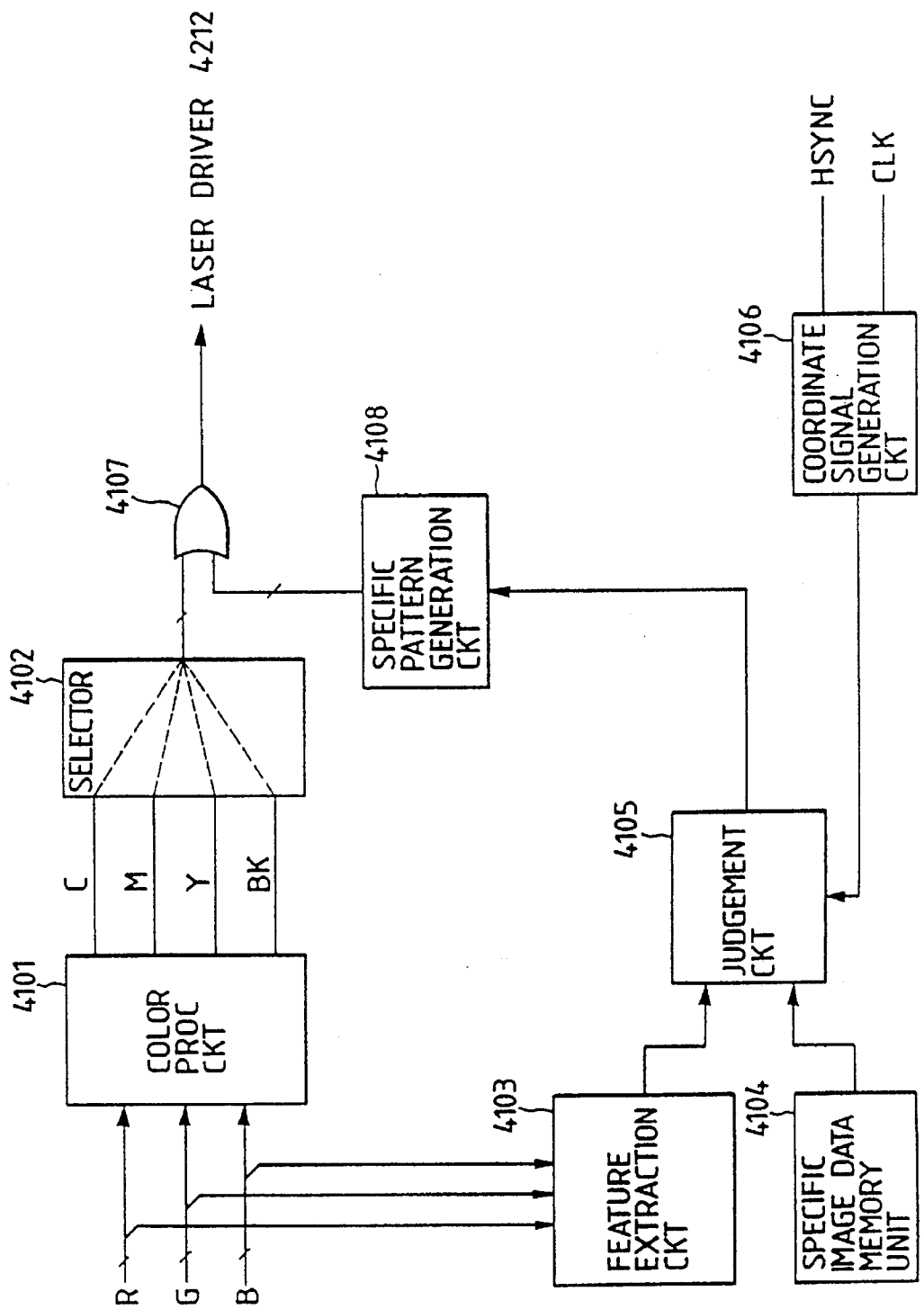
FIG. 34 is a block diagram of a sixth embodiment.
Figure 35:
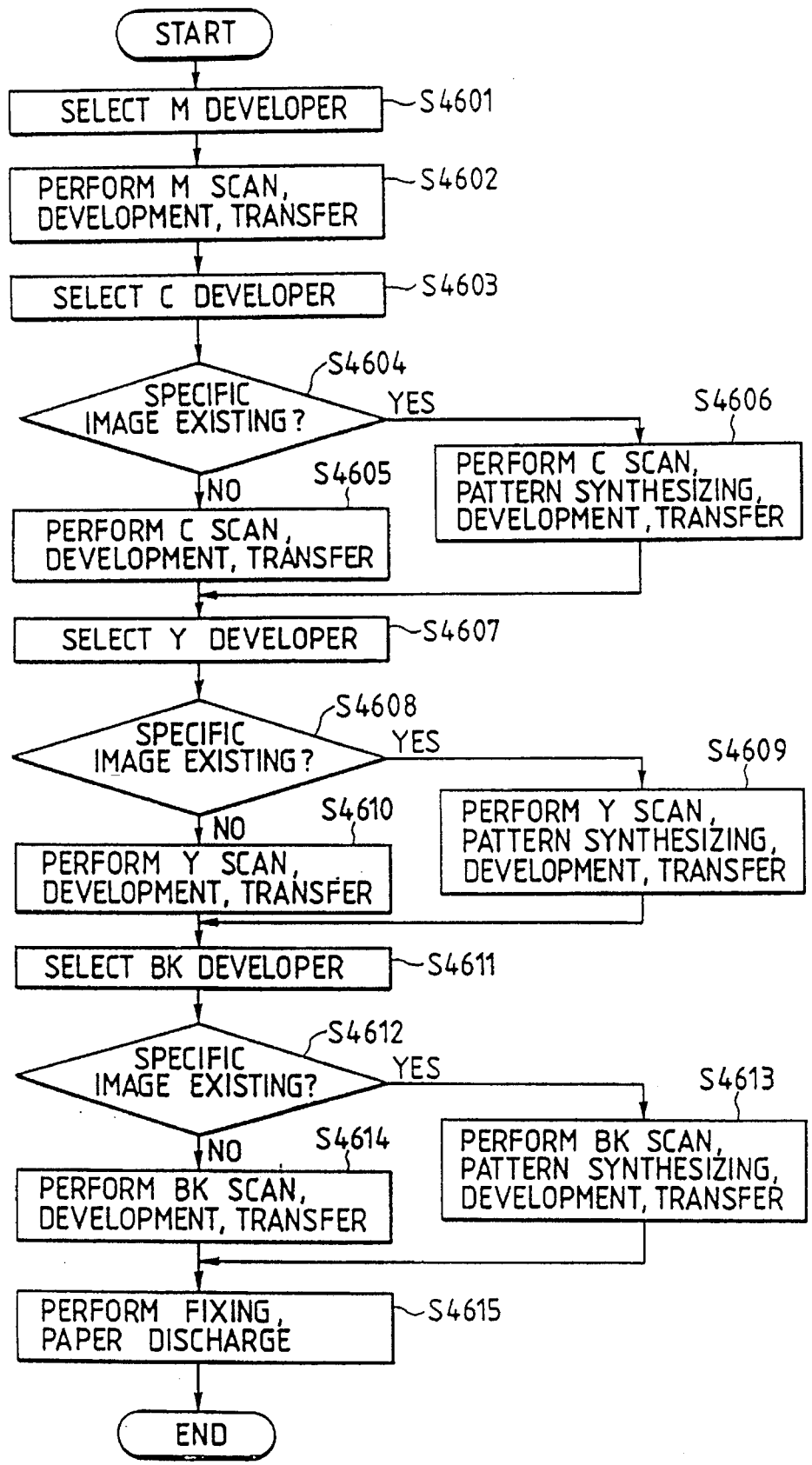
FIG. 35 is a flow chart of the control sequence of the sixth embodiment.

FIG. 34 is a block diagram of a sixth embodiment wherein components 4101–4107 are the same as those in FIG. 29. A specific pattern generating circuit 4108 generates a predetermined pattern when the judgment circuit 4105 releases an H-level signal, and said pattern signal is synthesized with the image signal in the OR gate 4107 to prevent the forgery.

Said pattern can be, for example a periodic pattern such as gratings or dots, or a certain character pattern such as "SAMPLE".

Such specific pattern may be formed with the toner of a color next to the color used for judgment as in the fifth embodiment shown in FIG. 31, or the toner of a color used for judgment as shown in FIG. 32, or the toner of black color or a predetermined color as shown in FIG. 33.

In the fifth embodiment, the predetermined image cannot be identified from the reproduced image regardless whether forgery is intended, because the reproduced copy or a part thereof is uniformly filled in with the toner. On the other hand, the present sixth embodiment is featured by the fact that the obtained copy can be satisfactorily utilized, for example for reference, if said specific pattern is suitably selected, as the copy is not uniformly filled in with the toner.

In such case, however, the image development and transfer have to be conducted always on M, C, Y and Bk colors regardless of the result of judgment, since the obtained image will become incomplete if the copying operation is terminated after the synthesis of said specific pattern.

[Embodiment 7]

FIG. 36 is a block diagram of an eighth embodiment of the present invention wherein, when the presence of the predetermined pattern is identified, the image signal is entirely or partially deleted, in contrast to the foregoing two embodiments in which a specific image signal is added to the image signal or a part thereof.

In FIG. 36, components 4101 to 4104 and 4106 are same as those in FIG. 29. In the present embodiment, the judgment circuit 4105 releases a signal "0" in the absence of the predetermined image, or a signal "0" in the presence thereof. An AND gate 4110 sends the color toner amount signal to a laser driver 4212 only when the predetermined image is not identified and the selector 4102 releases a signal "1". Said color toner amount signal is not released otherwise.

In the present embodiment, therefore, when the presence of the predetermined image is identified in the original image, the toner of all the colors or of a particular color is not supplied to the copy sheet or to a part thereof, thereby preventing the forgery of the banknote, security document or the like.

The present embodiment has an additional advantage of reduced consumption of the toner, because the predetermined image is not filled in with the toner.

As explained in the foregoing, the present embodiment utilizes means for identifying the predetermined image, thereby prohibiting the image reproduction of such predetermined image.

What is claimed is:

1. A controlling method for controlling an image forming apparatus which sequentially forms a plurality of color component images on a medium to produce a color image, said method comprising the steps of:

inputting color image data representing an original;

judging whether the original is a specific image based on the color image data; and controlling the image forming apparatus based on the judgment, in a case where the original is the specific image, such that accurate image forming of at least one, but not all, of the plurality of color component images is prevented.

2. A method according to claim 1, wherein the image forming apparatus forms a plurality of color component images sequentially frame-by-frame in order to produce a color image having one image plane.

3. A method according to claim 1, wherein the color image data is generated by an image reader for scanning the original.

4. A method according to claim 3, wherein the image reader repeats the scanning in response to each of the plurality of color component images.

5. A method according to claim 1, wherein the judging of the specific image is based on matching of a predetermined pattern.

6. A method according to claim 5, wherein the predetermined pattern is a predetermined figure having a predetermined color.

7. A method according to claim 1, wherein a black component image is a last color component of the plurality of color component images to be formed by the image forming apparatus.

8. A method according to claim 1, wherein the controlling of the image forming apparatus is realized by modification of the last color component image.

9. A method according to claim 8, wherein the modification is realized by formation of a mirror image.

10. A method according to claim 8, wherein the modification is realized by synthesizing of a predetermined pattern.

11. A controlling apparatus for controlling an image forming apparatus which sequentially forms a plurality of color component images on a medium to produce a color image, comprising:

input means for inputting color image data representing an original;

judging means for judging whether the original is a specific image based on the color image data; and controlling means for controlling the image forming apparatus based on the judgment of said judging means, in a case where the original is the specific image, such that accurate image forming of at least one, but not all, of the plurality of color component images is prevented.

12. An apparatus according to claim 11, wherein the image forming apparatus forms a plurality of color component images sequentially frame-by-frame in order to produce a color image having one image plane.

13. An apparatus according to claim 11, wherein the color image data is generated by an image reader for scanning the original.

14. An apparatus according to claim 13, wherein the image reader repeats the scanning in response to each of the plurality of color component images.

15. An apparatus according to claim 11, wherein the judging of the specific image is based on matching of a predetermined pattern.

16. An apparatus according to claim 15, wherein the predetermined pattern is a predetermined figure having a predetermined color.

17. An apparatus according to claim 11, wherein a black component image is a last color component of the plurality of color component images to be formed by the image forming apparatus.

18. An apparatus according to claim 11, wherein the controlling of the image forming apparatus is realized by modification of the last color component image.

19. An apparatus according to claim 18, wherein the modification is realized by formation of a mirror image.

20. An apparatus according to claim 18, wherein the modification is realized by synthesizing of a predetermined pattern.

* * * * *

UNITED STATES PATENT AND TRADEMARK OFFICE
CERTIFICATE OF CORRECTION

PATENT NO. : 5,621,810

DATED : April 15, 1997

INVENTORS : Yoshiyuki Suzuki, et al.          Page 1 of 3

It is certified that error appears in the above-identified patent and that said Letters Patent is hereby corrected as shown below:

On the title page;
<u>REFERENCES CITED</u>

U.S. PATENT DOCUMENTS

Please insert:

```
--3,873,974   3/1975    Bouton et al....340/146.3AC
  4,118,122  10/1978    Rees et al.......355/77
  4,179,685  12/1979    O'Maley.........340/146.3H
  4,463,386   7/1984    Goddard et al...358/261--
```

FOREIGN PATENT DOCUMENTS

```
"60-229572    4/1984    Japan" should read
--60-229572  11/1985    Japan--.
```

Please insert:

```
--101115      2/1984    European Pat. Off....G07D   7/00
  303474      2/1989    European Pat. Off....G03G  15/01--
```

UNITED STATES PATENT AND TRADEMARK OFFICE
CERTIFICATE OF CORRECTION

PATENT NO. : 5,621,810

DATED : April 15, 1997

INVENTORS : Yoshiyuki Suzuki, et al.

It is certified that error appears in the above-identified patent and that said Letters Patent is hereby corrected as shown below:

Please insert:

--OTHER PUBLICATIONS

IBM Technical Disclosure Bulletin, Vol. 19, Nov. 4, Sept. 1976.--

ABSTRACT

Line 2, "particularly" should read --particular--.

COLUMN 5

Line 59, "606 and" should read --and 606--.

COLUMN 6

Line 28, "$X_t=$ of 2's" should read --$X_t=1$--.

Line 30, ""1"" should read --of 2's--.

Line 66, "A>B," should read --A<B,--.

UNITED STATES PATENT AND TRADEMARK OFFICE
CERTIFICATE OF CORRECTION

PATENT NO. : 5,621,810

DATED : April 15, 1997

INVENTORS : Yoshiyuki Suzuki, et al.

It is certified that error appears in the above-identified patent and that said Letters Patent is hereby corrected as shown below:

COLUMN 8

Line 64, "$(X_0, Y^0)$" should read --$(X_0, Y_0)$--.

COLUMN 10

Line 36, "B(i, D)" should read --B(i, j)--.

Line 57, "(Anding)" should read --(ANDing)--.

COLUMN 11

Line 22, "or" should read --of--.

COLUMN 18

Line 1, "pressure" should read --presence--.

Signed and Sealed this

Twentieth Day of October, 1998

Attest:

BRUCE LEHMAN

*Attesting Officer*   *Commissioner of Patents and Trademarks*